(12) United States Patent
Chung et al.

(10) Patent No.: US 11,507,858 B2
(45) Date of Patent: Nov. 22, 2022

(54) RAPID PREDICTIVE ANALYSIS OF VERY LARGE DATA SETS USING THE DISTRIBUTED COMPUTATIONAL GRAPH USING CONFIGURABLE ARRANGEMENT OF PROCESSING COMPONENTS

(71) Applicant: QOMPLX, Inc., Tysons, VA (US)

(72) Inventors: Jeffrey Chung, Reston, VA (US); Jason Crabtree, Vienna, VA (US); Luka Jurukovski, Reston, VA (US); Bhashit Parikh, Reston, VA (US); Andrew Sellers, Monument, CO (US)

(73) Assignee: QOMPLX, INC., Reston, VA (US)

( * ) Notice: Subject to any disclaimer, the term of this patent is extended or adjusted under 35 U.S.C. 154(b) by 0 days.

(21) Appl. No.: 16/709,598

(22) Filed: Dec. 10, 2019

(65) Prior Publication Data

US 2020/0293920 A1 Sep. 17, 2020

Related U.S. Application Data

(63) Continuation-in-part of application No. 14/925,974, filed on Oct. 28, 2015, now abandoned.

(51) Int. Cl.
*G06N 5/04* (2006.01)
*G06N 20/00* (2019.01)
*G06F 16/901* (2019.01)

(52) U.S. Cl.
CPC ........... *G06N 5/04* (2013.01); *G06F 16/9024* (2019.01); *G06N 20/00* (2019.01)

(58) Field of Classification Search
CPC ....... G06N 5/04; G06N 20/00; G06F 16/9024
See application file for complete search history.

(56) References Cited

U.S. PATENT DOCUMENTS

| 2005/0209993 | A1* | 9/2005 | Koehler ............. G06Q 10/0633 |
| 2007/0174233 | A1 | 7/2007 | Ginis et al. |
| 2009/0171999 | A1 | 7/2009 | McColl et al. |
| 2009/0235251 | A1 | 9/2009 | Li et al. |
| 2013/0262443 | A1 | 10/2013 | Leida et al. |
| 2013/0290554 | A1 | 10/2013 | Chen et al. |

(Continued)

OTHER PUBLICATIONS

Gowda, Indhu Mathi. "Design and Implementation of a Data Persistence Layer for the GEMMA Framework." (2017). (Year: 2017).*

*Primary Examiner* — Casey R. Garner
(74) *Attorney, Agent, or Firm* — Galvin Patent Law LLC; Brian R. Galvin; Brian S. Boon

(57) ABSTRACT

A system for predictive analysis of very large data sets using a distributed computational graph that intelligently combines processing of a current data stream with the ability to retrieve relevant stored data in such a way that conclusions or actions may be drawn in a predictive manner. The system has a pipeline construction module that allows a user to construct a streaming analytic workflow using modular building blocks, each of which represents either an environmental orchestration stage or a data processing stage of a streaming analytic workflow, and has a pipeline processing module that receives a data stream and constructs a directed computational graph by processing the data stream through the streaming analytic workflow. The directed computational graph is used to analyze the data stream.

14 Claims, 25 Drawing Sheets

(56) References Cited

U.S. PATENT DOCUMENTS

| | | |
|---|---|---|
| 2015/0254330 A1 | 9/2015 | Chan et al. |
| 2016/0092557 A1 | 3/2016 | Stojanovic et al. |
| 2016/0098037 A1 | 4/2016 | Zorino et al. |
| 2016/0358102 A1* | 12/2016 | Bowers ................ G06N 20/00 |
| 2017/0006135 A1 | 1/2017 | Siebel et al. |
| 2017/0090893 A1* | 3/2017 | Aditya ..................... G06F 8/51 |
| 2018/0075125 A1* | 3/2018 | Stiel ................. G06F 16/90335 |
| 2019/0155646 A1* | 5/2019 | Bishop ................. G06F 9/4881 |
| 2019/0347369 A1* | 11/2019 | Ebstyne .............. G06K 9/6262 |

\* cited by examiner

RAPID PREDICTIVE ANALYSIS OF VERY LARGE DATA SETS USING THE DISTRIBUTED COMPUTATIONAL GRAPH USING CONFIGURABLE ARRANGEMENT OF PROCESSING COMPONENTS

CROSS-REFERENCE TO RELATED APPLICATIONS

| Application No. | Date Filed | Title |
|---|---|---|
| Current application | Herewith | RAPID PREDICTIVE ANALYSIS OF VERY LARGE DATA SETS USING THE DISTRIBUTED COMPUTATIONAL GRAPH USING CONFIGURABLE ARRANGEMENT OF PROCESSING COMPONENTS Is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH | the entire specification of each of which is incorporated herein by reference.

BACKGROUND OF THE INVENTION

Field of the Invention

The present invention is in the field of analysis of very large data sets using distributed computational graph tools which allow for transformation of data through both linear and non-linear transformation pipelines in which the pipelines are constructed using easily configurable arrangements of processing components that act as stages within a larger processing pipeline.

Discussion of the State of the Art

The ability to transfer information between individuals, even over large distances, is credited with allowing mankind to rise from a species of primate gatherer-scavengers to forming simple communities. The ability to stably record information so that it could be analyzed for repetitive events, trends, and serve as a base to be expanded and built upon. It is safe to say that the availability of information in formats that allow it to be analyzed and added to by both individuals contemporary to its accrual and those who come after is the most powerful tool available to mankind and likely is what has propelled us to the level of social and technological achievement we have attained.

Nothing has augmented our ability to gather and store information analogous to the rise of electronic and computer technology. There are sensors of all types to measure just about any condition one can imagine. Computers have allowed the health information for a large portion of the human population is stored and accessible. Similarly, detailed data on vehicular accidents, both environmental and vehicle component factors Airline mishaps and crashes can be recreated and studied in great detail. Item information is recorded for the majority of consumer purchases. Further examples abound, but the point has been made. Computer database technology has allowed all of this information to be reliably stored for future retrieval and analysis. The benefits of database technology are so strong that there are very few businesses large or small that do not make some use of a data and knowledge storage solution, either directly for such tasks as inventory control and forecasting or customer relations, or indirectly for ordering. The meteoric rise of computer networking the internet has only served to turn the accrual of information into a torrent as now huge populations can exchange observations, data and ideas, even invited to do so; vast arrays of sensors can be tied together in meaningful ways all of which can be stored for future analysis and use. The receipt and storage of data has gotten to the point where an expert has been quoted as estimating that as much data is currently accrued in two days as was accrued in all history prior to 2003 (Eric Schmidt, Google). Entirely new distributed data storage and retrieval technologies such as Hadoop, and map/reduce; and graph and column based data store organization have been developed to accommodate the influx of information and provide some ability to retrieve information in a guided fashion, but such retrieval has proven to be too labor intensive and rigid to be of use in all but the more superficial and simple of campaigns. Presently, we are accruing vast amounts of information daily but do not have the tools to analyze all but a trickle into knowledge or informed action. What is needed is a system to allow the analysis of current, possibly complex and changing streaming data of interest in the context of the vast stored data that has accumulated relating to it such that meaningful conclusions made and effective action can be taken. To be of use, such a system would also need to possess the ability to self-assess its own operations and key intermediate factors in both the data stream and stored information and make changes to its own function to optimize function and maximize the probability of reliable conclusions.

Data pipelines, which are a progression of functions which each perform some action or transformation on a data stream, offer a mechanism to process quantities of data in the volume discussed directly above. To date however, data pipelines have either been extremely limited in what they do, for example "move data from a web based merchant site to a distributed data store; extract all purchases and classify by product type and region; store the result logs" or have been rigidly programmed and possibly required the uses of highly specific remote protocol calls to perform needed tasks. Even with these additions their capabilities have been very limited and, they have all been linear in configuration which precludes their use for analysis and conclusion or action discovery in a majority of complex situations where branching or even recurrent modification is needed.

What is needed is a system that intelligently combines processing of a current data stream with the ability to retrieve relevant stored data in such a way that conclusions or actions may be drawn in a predictive manner. To work in a timely and efficient manner, the system needs the ability to monitor for both operational issues within its components and should be able to learn and react to intermediate determinations of the analyses it runs and also should be able to self-modify to maintain optimal operation. The system also needs to be built using easily configurable arrangements of processing components that act as stages within a larger processing pipeline.

SUMMARY OF THE INVENTION

The inventor has developed a system for rapid predictive analysis of very large data sets using a distributed computational graph that intelligently combines processing of a current data stream with the ability to retrieve relevant stored data in such a way that conclusions or actions may be drawn in a predictive manner. The system has a pipeline construction module that allows a user to construct a streaming analytic workflow using modular building blocks, each of which represents either an environmental orchestration stage or a data processing stage of a streaming analytic workflow, and has a pipeline processing module that receives a data stream and constructs a directed computational graph by processing the data stream through the streaming analytic workflow. The directed computational graph is used to analyze the data stream.

According to a preferred embodiment of the invention, a system for predictive analysis of very large data sets using a directed computational graph is disclosed, comprising: a processor, a memory, a non-volatile data storage, and a first plurality of programming instructions stored in the memory and operable on the processor of a computing device; a pipeline construction module comprising a second plurality of programming instructions stored in the memory of the computing device, wherein the second plurality of programming instructions, when operating on the processor of the computing device, cause the computing device to: present a graphical user interface to a user comprising modular building blocks, each comprising modular building blocks comprising either a declarative definition of an environmental orchestration stage of a streaming analytics workflow or a declarative definition of a data processing stage of a streaming analytics workflow; and receive and store input from the user through the graphical user interface, the input comprising a streaming analytics workflow constructed by the user using the modular building blocks; and a pipeline processing module comprising a third plurality of programming instructions stored in the memory of the computing device, wherein the third plurality of programming instructions, when operating on the processor of the computing device, cause the computing device to: retrieve the stored streaming analytics workflow; receive a first data stream for analysis using the streaming analytics workflow; construct a directed computational graph by processing the first data stream through the streaming analytics workflow; wherein the directed computational graph comprises nodes representing workflow stages and edges representing message outputs between the workflow stages; wherein the workflow stages comprise: one or more environmental orchestration stages, each configured to: set up data processing stages and data paths; and teardown data processing stages; and one or more data processing stages each comprising one or more data source stages, one or more data sink stages, and a plurality of transformation stages; and wherein the directed computational graph is used to produce a result of analysis of the first data stream.

According to another preferred embodiment, a method for predictive analysis of very large data sets using a directed computational graph is disclosed, comprising the steps of: presenting a graphical user interface to a user comprising modular building blocks, each comprising modular building blocks comprising either a declarative definition of an environmental orchestration stage of a streaming analytics workflow or a declarative definition of a data processing stage of a streaming analytics workflow; and receiving and storing input from the user through the graphical user interface, the input comprising a streaming analytics workflow constructed by the user using the modular building blocks; retrieving the stored streaming analytics workflow; receiving a first data stream for analysis using the streaming analytics workflow; and constructing a directed computational graph by processing the first data stream through the streaming analytics workflow; wherein the directed computational graph comprises nodes representing workflow stages and edges representing message outputs between the workflow stages; wherein the workflow stages comprise: one or more environmental orchestration stages, each configured to: set up data processing stages and data paths; and teardown data processing stages; and one or more data processing stages each comprising one or more data source stages, one or more data sink stages, and a plurality of transformation stages; and wherein the directed computational graph is used to produce a result of analysis of the first data stream.

According to an aspect of an embodiment, the directed computational graph further comprises one or more cyclic workflows.

According to an aspect of an embodiment, a workflow stage in the directed computational graph is constructed using a different workflow stage in the directed computational graph.

According to an aspect of an embodiment, the pipeline processing module is configured to employ exactly-once semantics; wherein a datapoint is the data stream impacts the construction of the directed computational graph the first time that it is received, and subsequent instances of an identical or semantically-similar datapoint in the data stream do not impact the construction of the directed computational graph.

According to an aspect of an embodiment, the streaming analytics workflow comprises analysis of the data stream in a sliding time window.

According to an aspect of an embodiment, the modular building blocks are domain-agnostic.

According to an aspect of an embodiment, the modular building blocks are domain-specific.

According to an aspect of an embodiment, a second data stream is received comprising a data context that is preserved from the first stream into a node of the directed computational graph, the data context shared at the node allowing the first data stream and the second data stream to share common meaning of data associated with the data context.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 4:
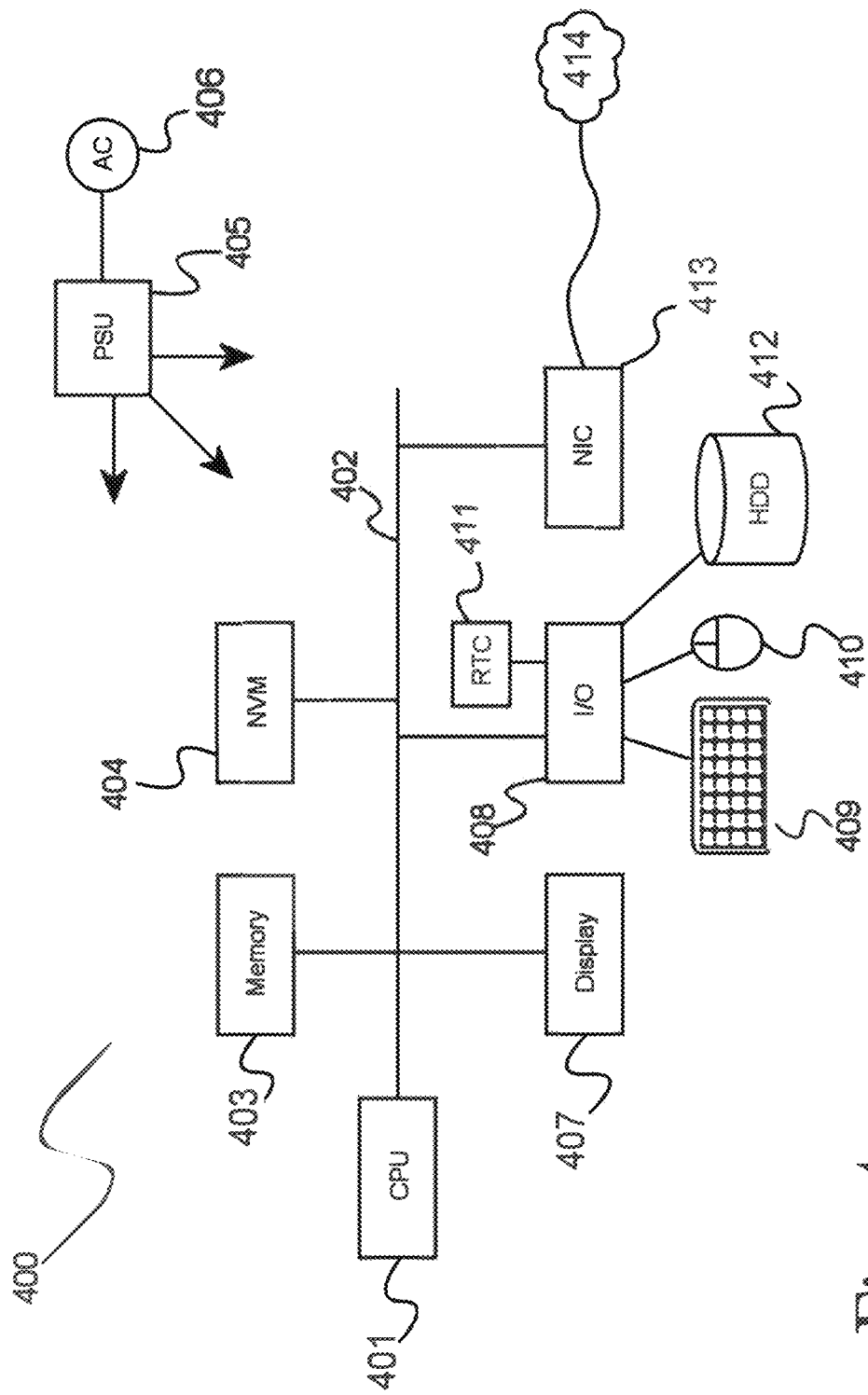
Figure 5:
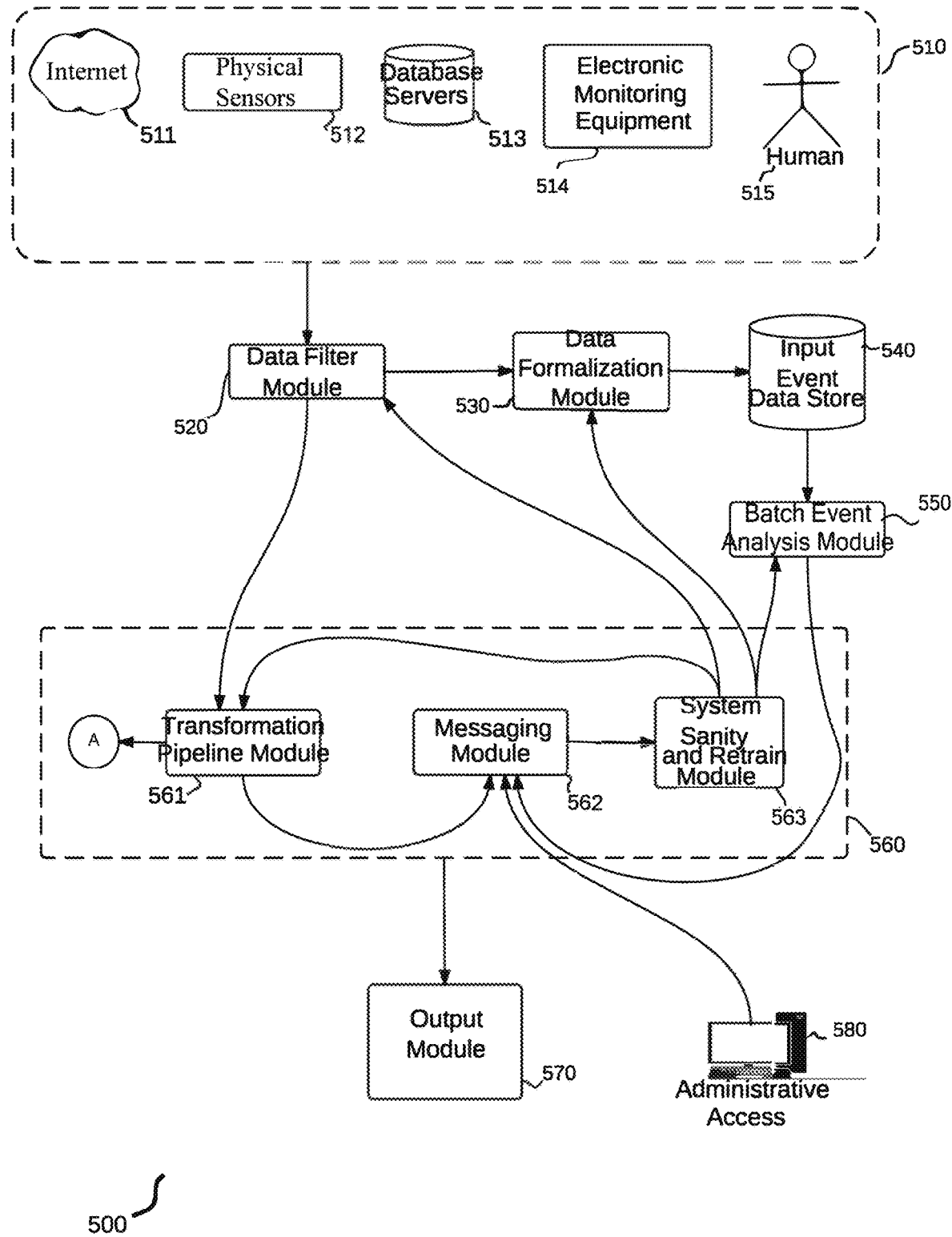

FIG. 4 is a block diagram illustrating an exemplary overview of a computer system as may be used in any of the various locations throughout the system FIG. 5 is a diagram of an exemplary architecture for a system where streams of input data from one or more of a plurality of sources are analyzed to predict outcome using both batch analysis of acquired data and transformation pipeline manipulation of current streaming data according to an embodiment of the invention.

Figure 6:
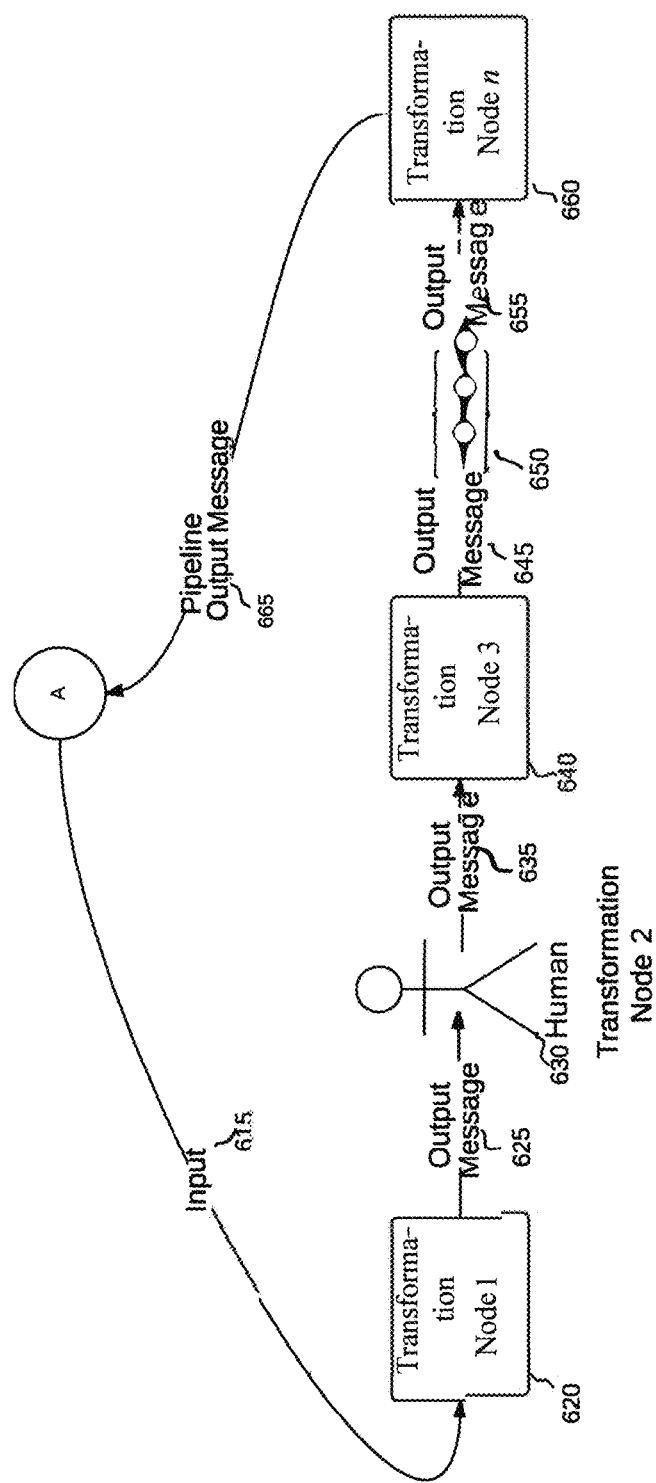

FIG. 6 is a diagram of an exemplary architecture for a linear transformation pipeline system which introduces the concept of the transformation pipeline as a directed graph of transformation nodes and messages according to an embodiment of the invention.

Figure 7:
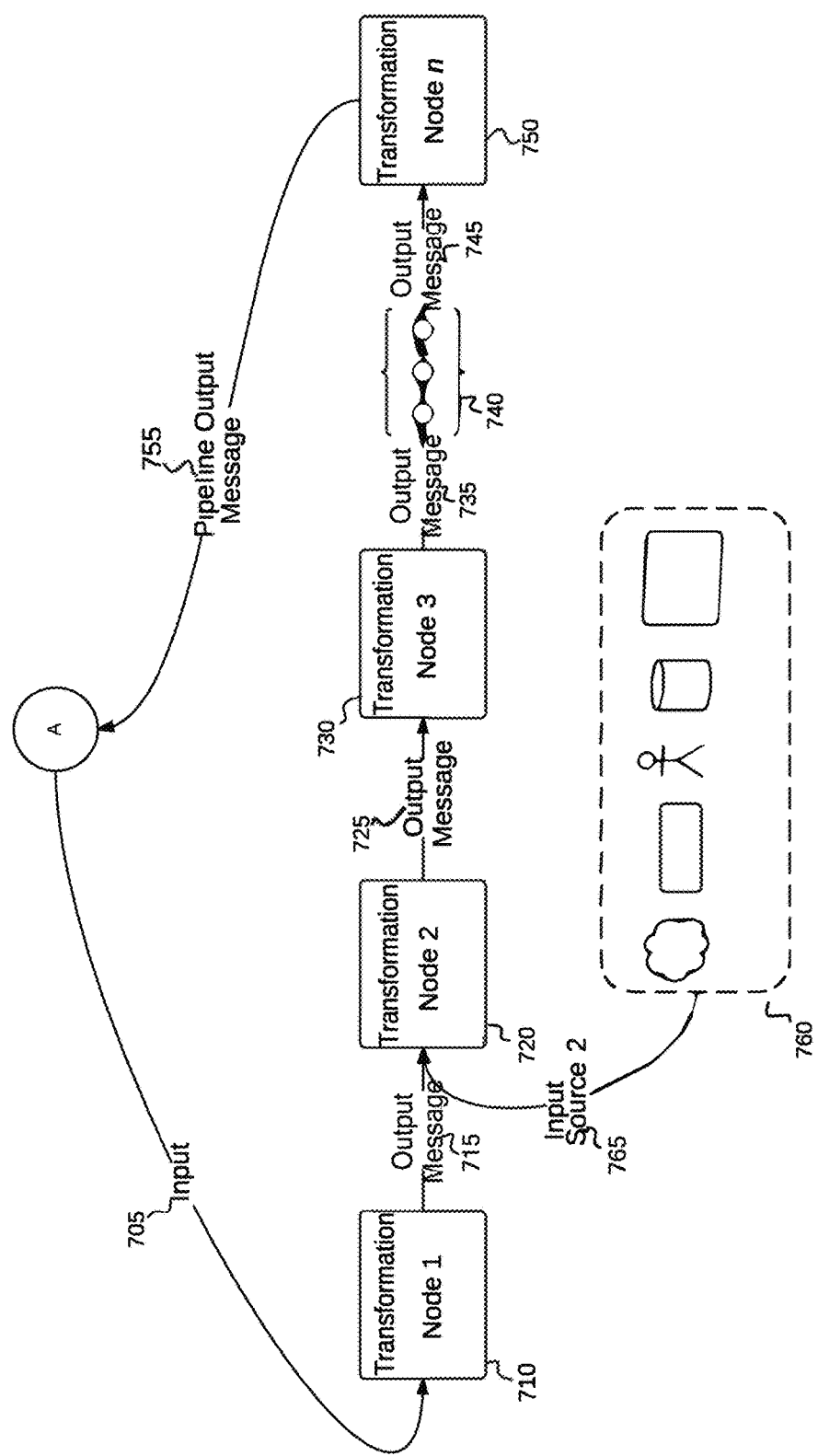

FIG. 7 is a diagram of an exemplary architecture for a transformation pipeline system where one of the transformations receives input from more than one source which introduces the concept of the transformation pipeline as a directed graph of transformation nodes and messages according to an embodiment of the invention.

Figure 8:
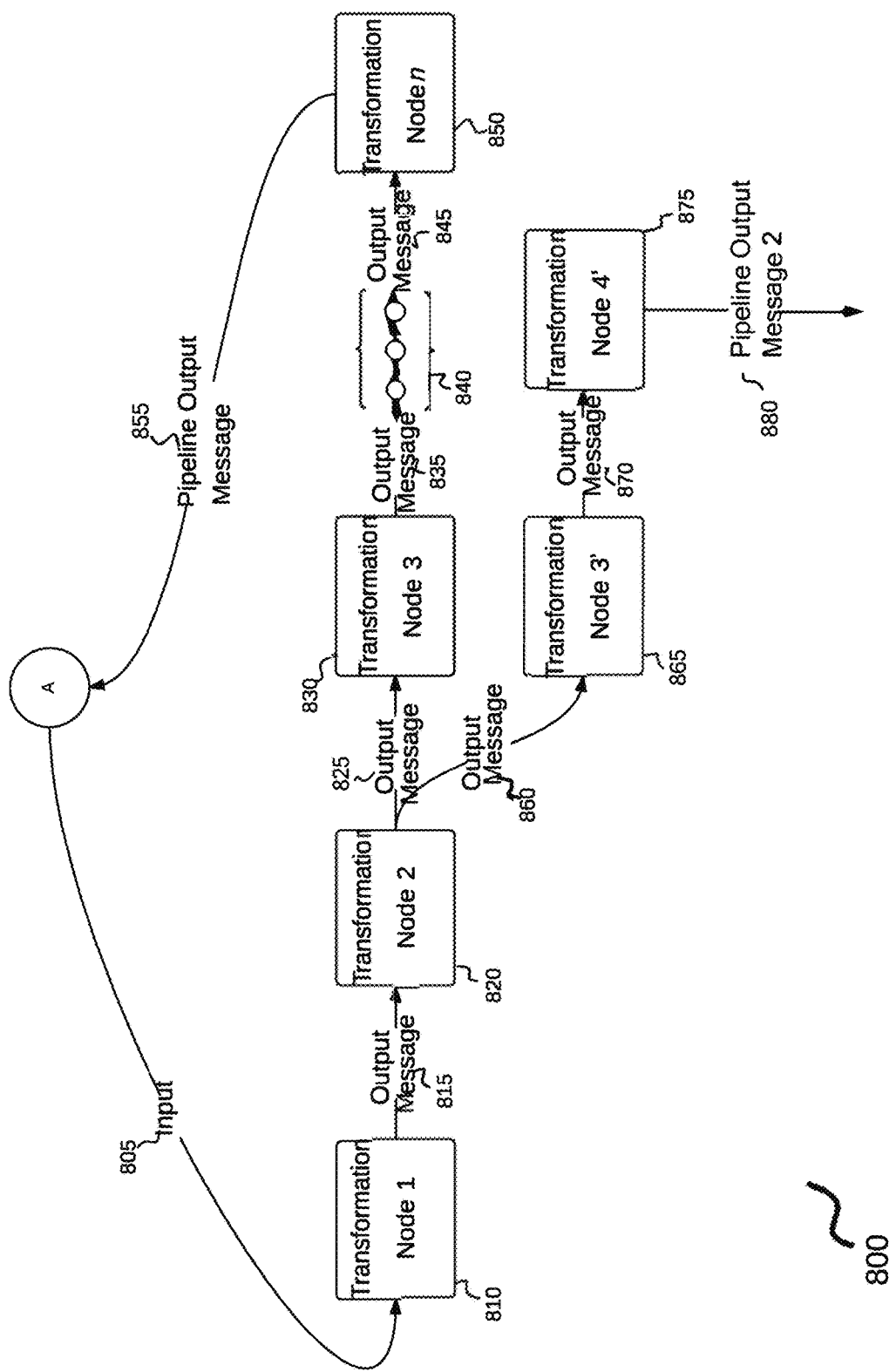

FIG. 8 is a diagram of an exemplary architecture for a transformation pipeline system where the output of one data transformation servers as the input of more than one downstream transformation which introduces the concept of the transformation pipeline as a directed graph of transformation nodes and messages according to an embodiment of the invention.

Figure 9:
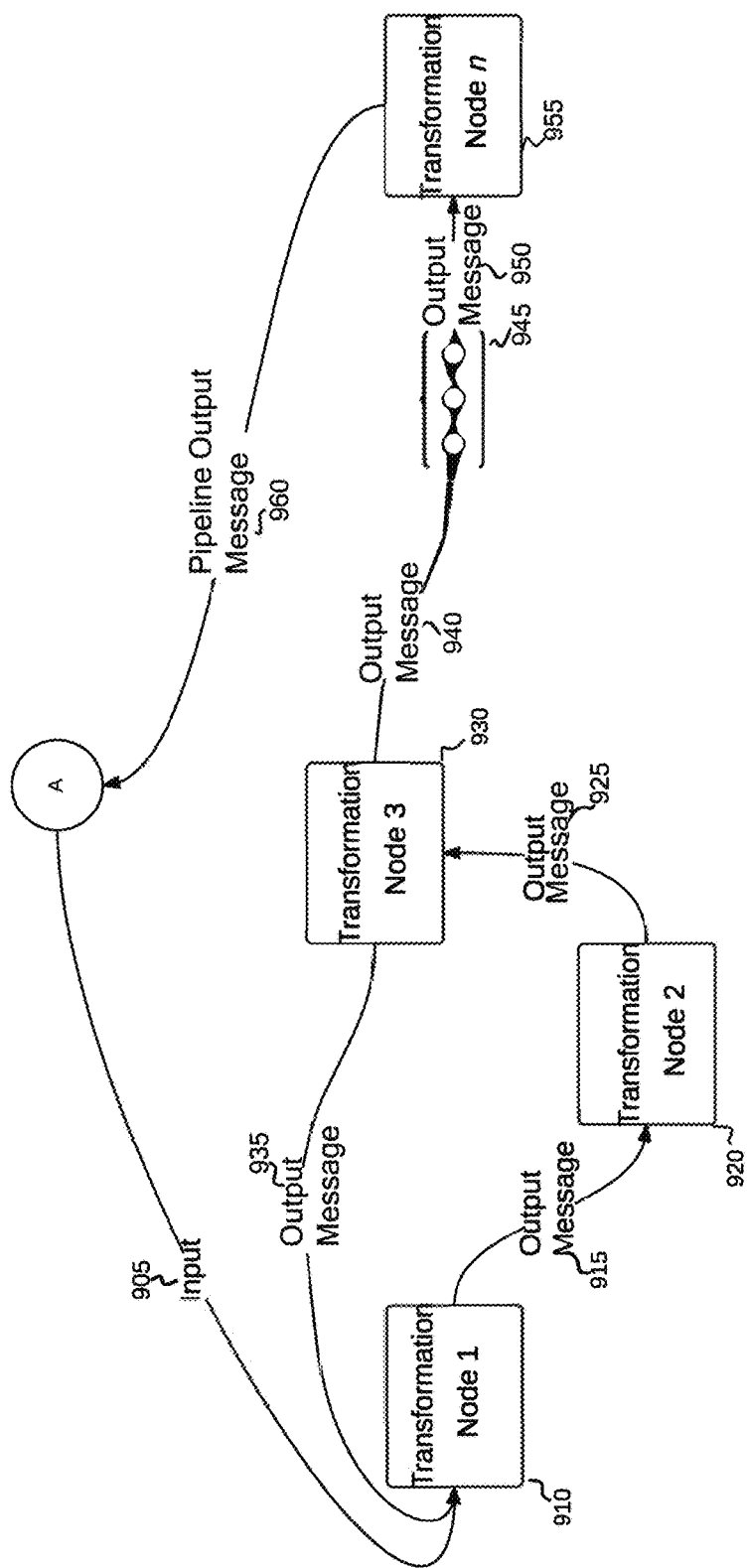

FIG. 9 is a diagram of an exemplary architecture for a transformation pipeline system where a set of three data transformations act to form a cyclical pipeline which also introduces the concept of the transformation pipeline as a directed graph of transformation lodes and messages according to an embodiment of the invention.

Figure 10:
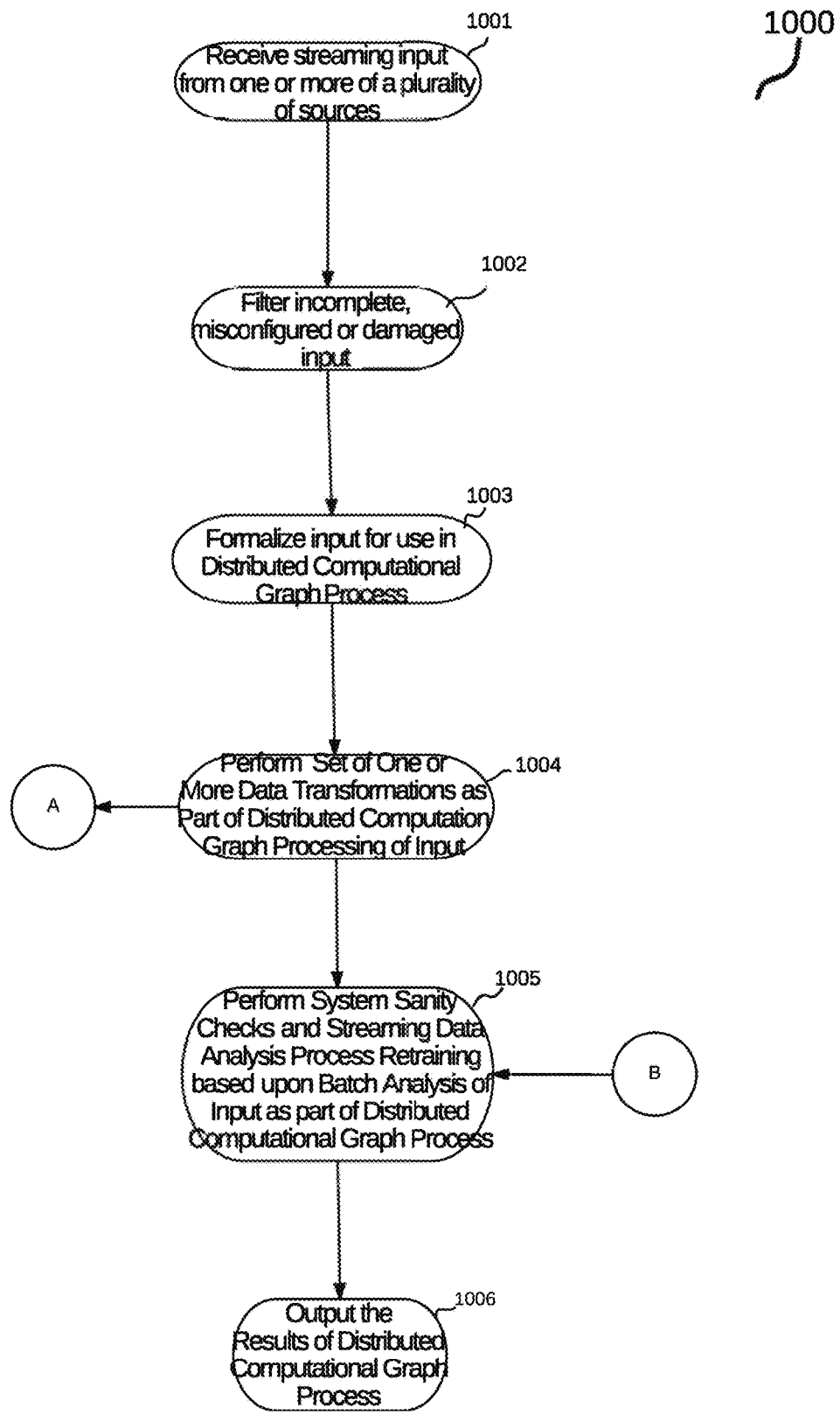

FIG. 10 is a process flow diagram of a method for the receipt, processing and predictive analysis of streaming data using a system of the invention.

Figure 11:
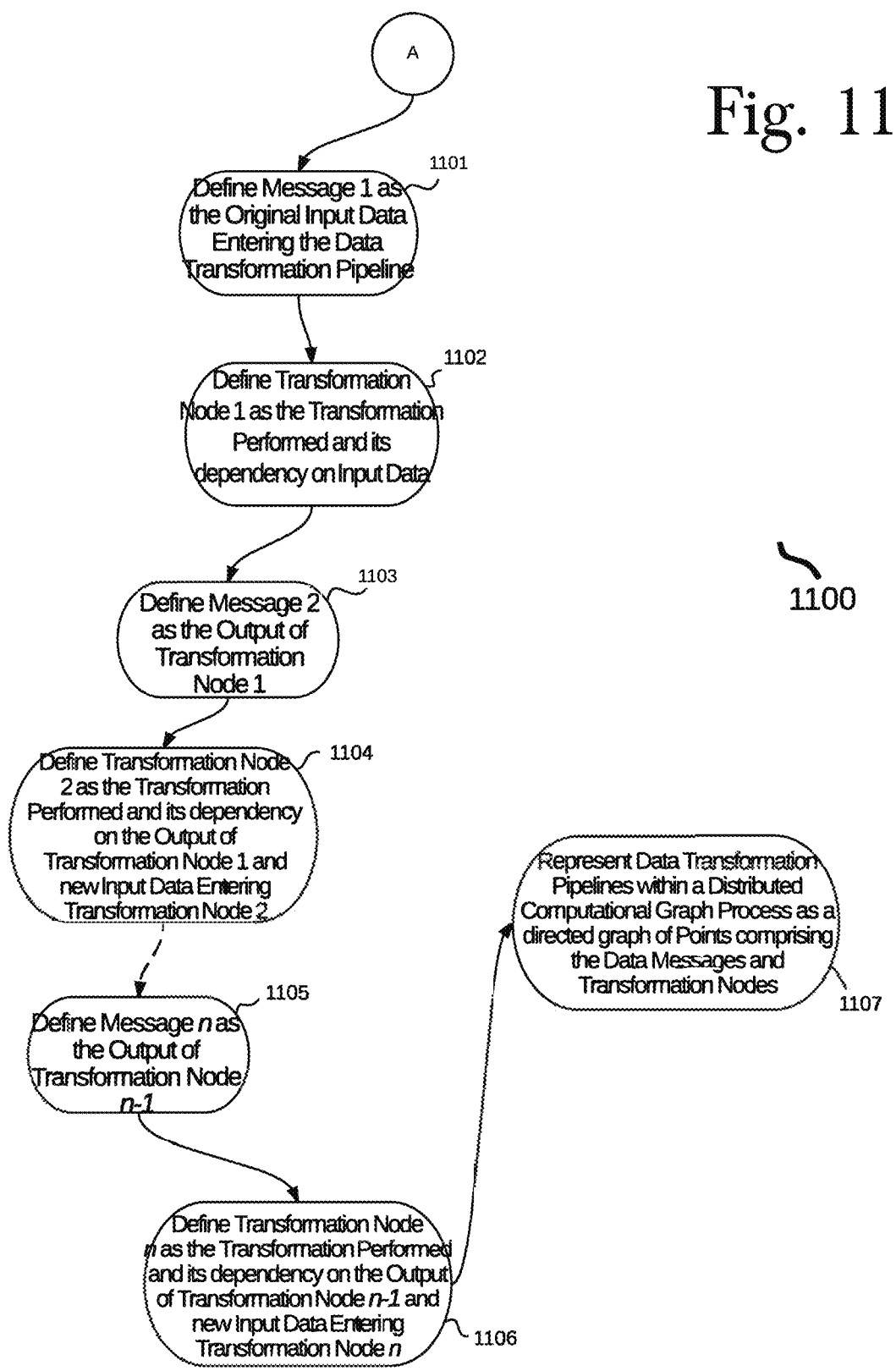

FIG. 11 is a process flow diagram of a method for representing the operation of the transformation pipeline as a directed graph function using a system of the invention.

Figure 12:
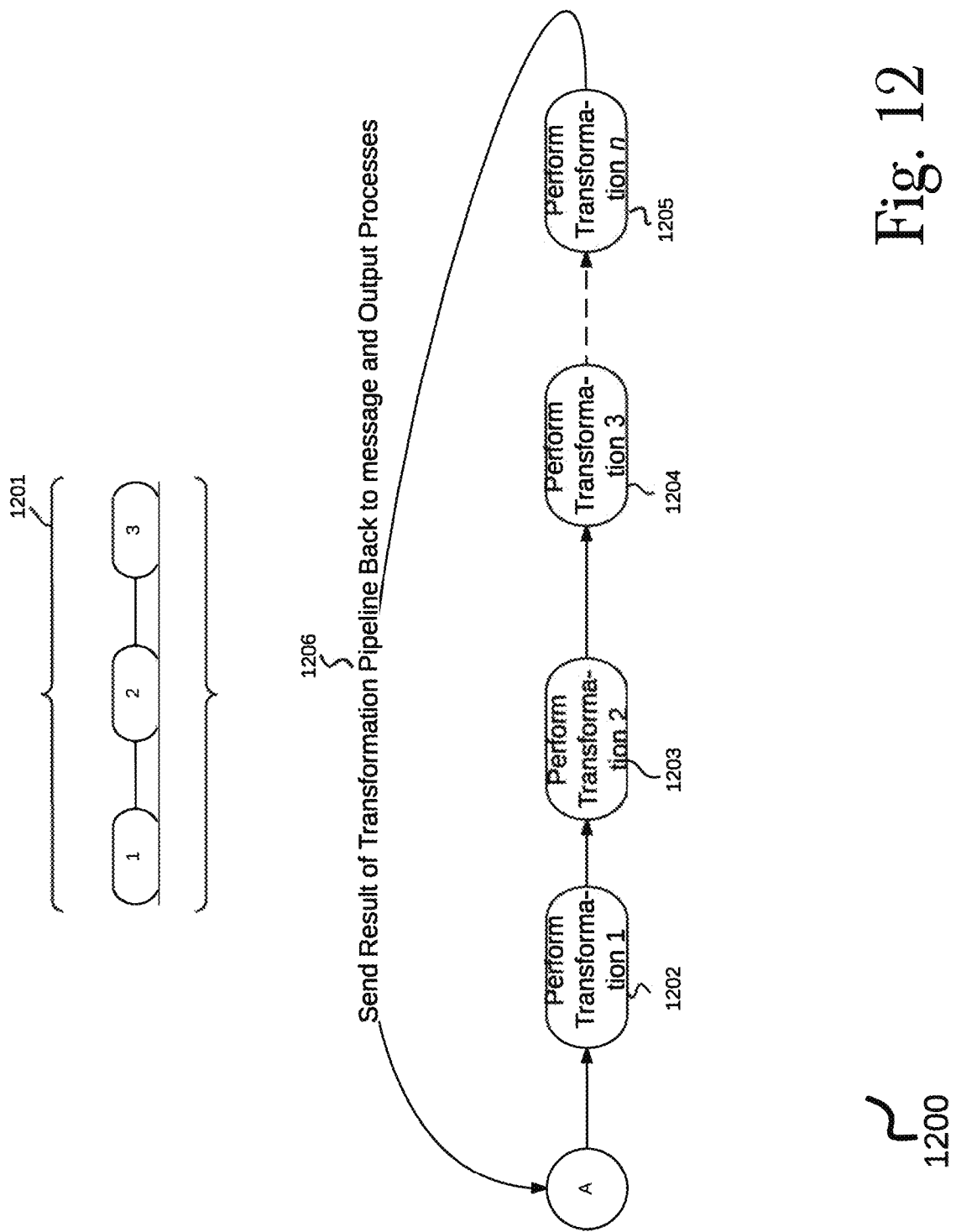

FIG. 12 is a process flow diagram of a method for a linear data transformation pipeline using a system of the invention.

Figure 13:
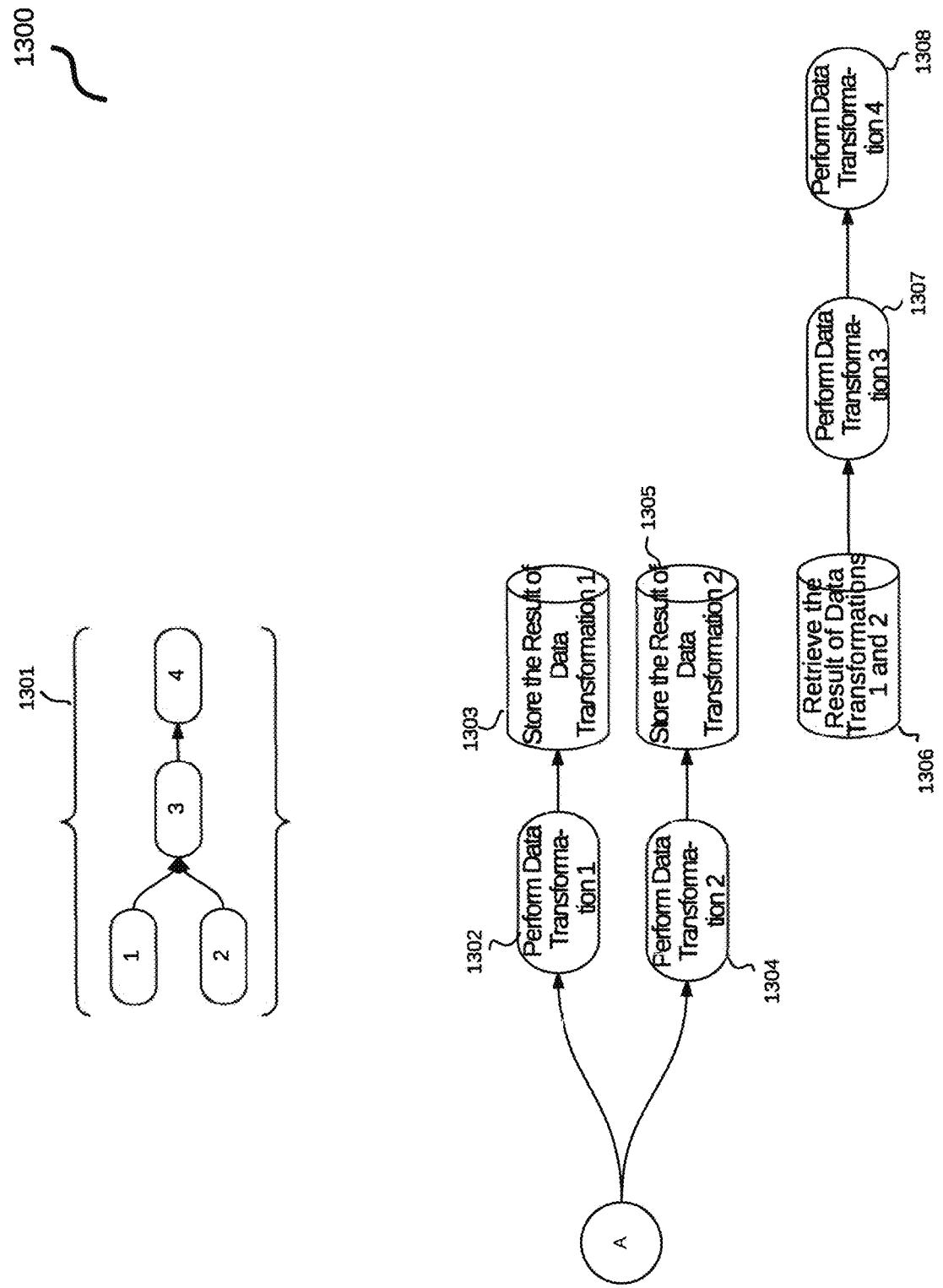

FIG. 13 is a process flow diagram of a method for the disposition of input from two antecedent data transformations into a single data transformation of transformation pipeline using a system of the invention.

Figure 14:
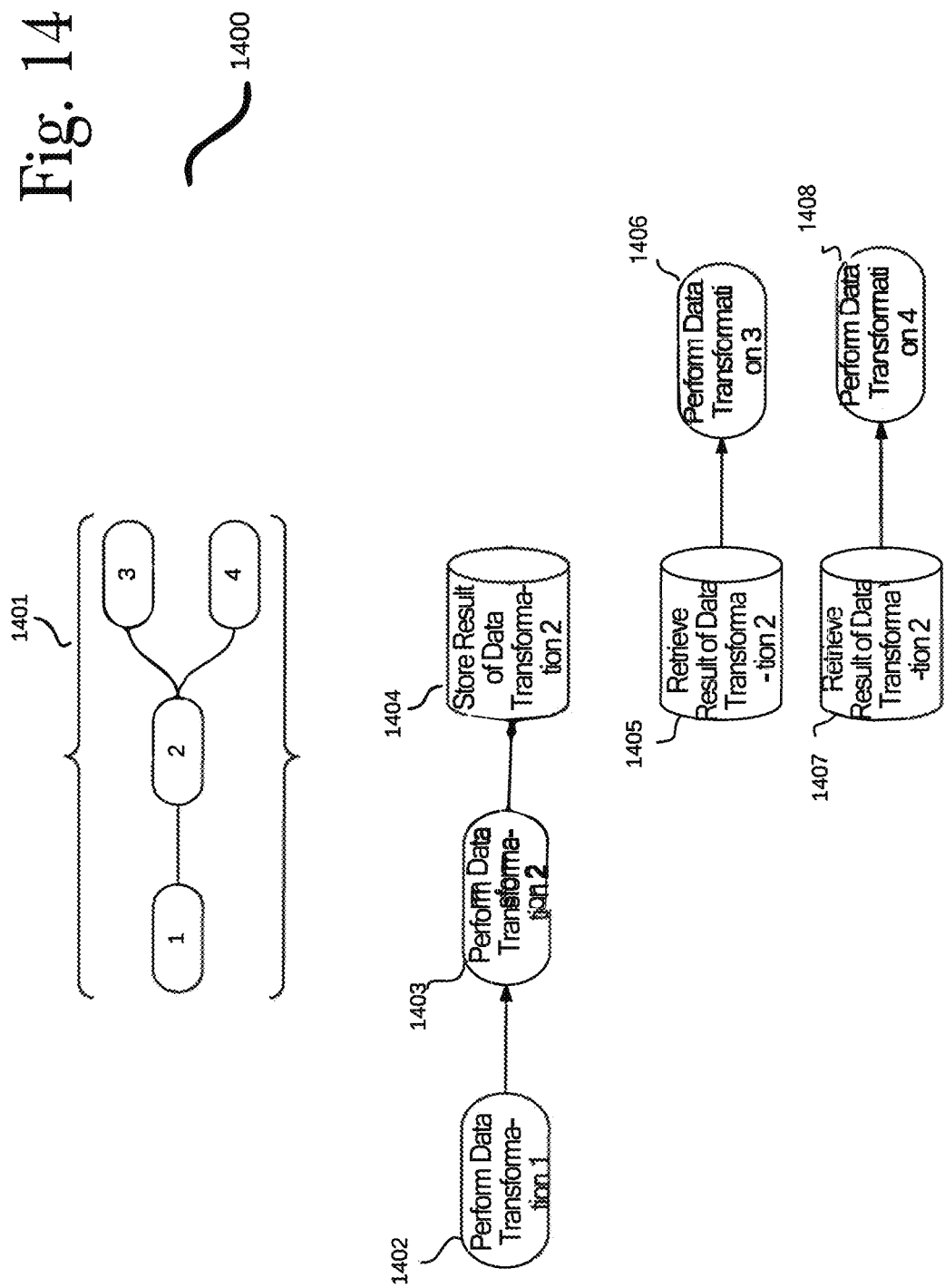

FIG. 14 is a process flow diagram of a method for the disposition of output of one data transformation that then serves as input to two postliminary data transformations using a system of the invention.

Figure 15:
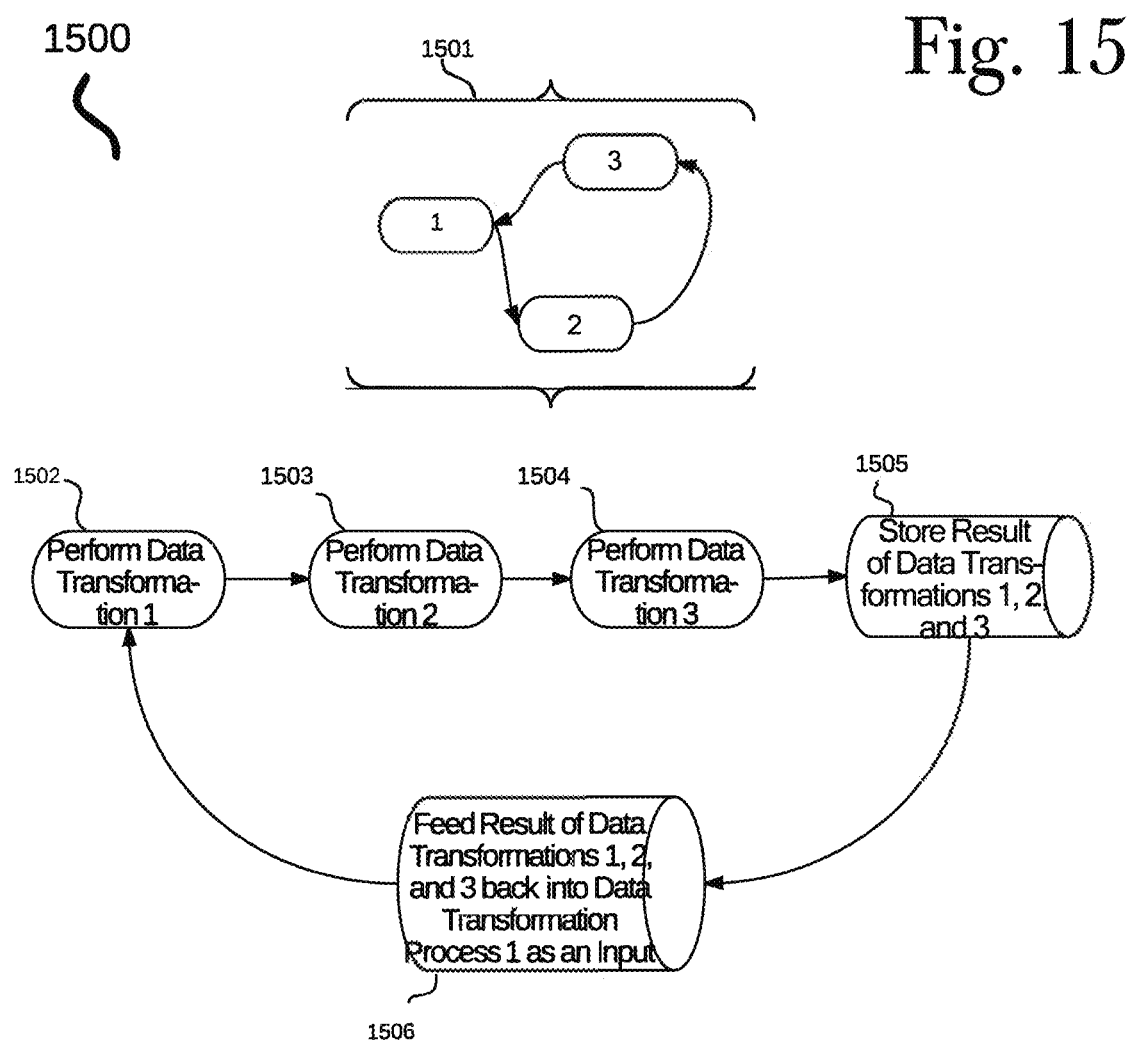

FIG. 15 is a process flow diagram of a method for processing a set of three or more data transformations within a data transformation pipeline where output of the last member transformation of the set serves as input of the first member transformation thereby creating a cyclical relationship using a system of the invention.

Figure 16:
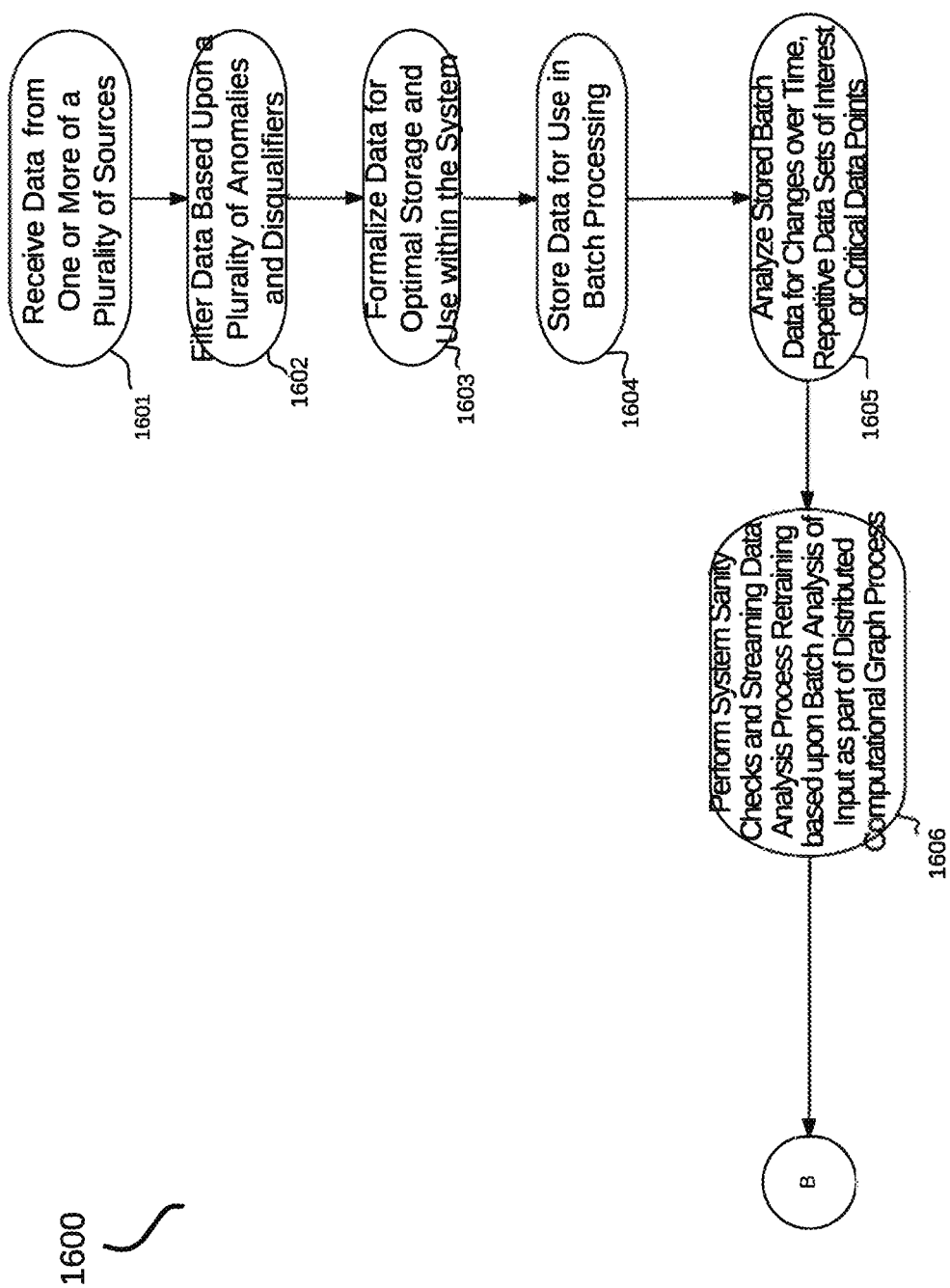

FIG. 16 is a process flow diagram of a method for the receipt and use of streaming data into batch storage and analysis of changes over time, repetition of specific data sequences or the presence of critical data points using a system of the invention.

Figure 17:
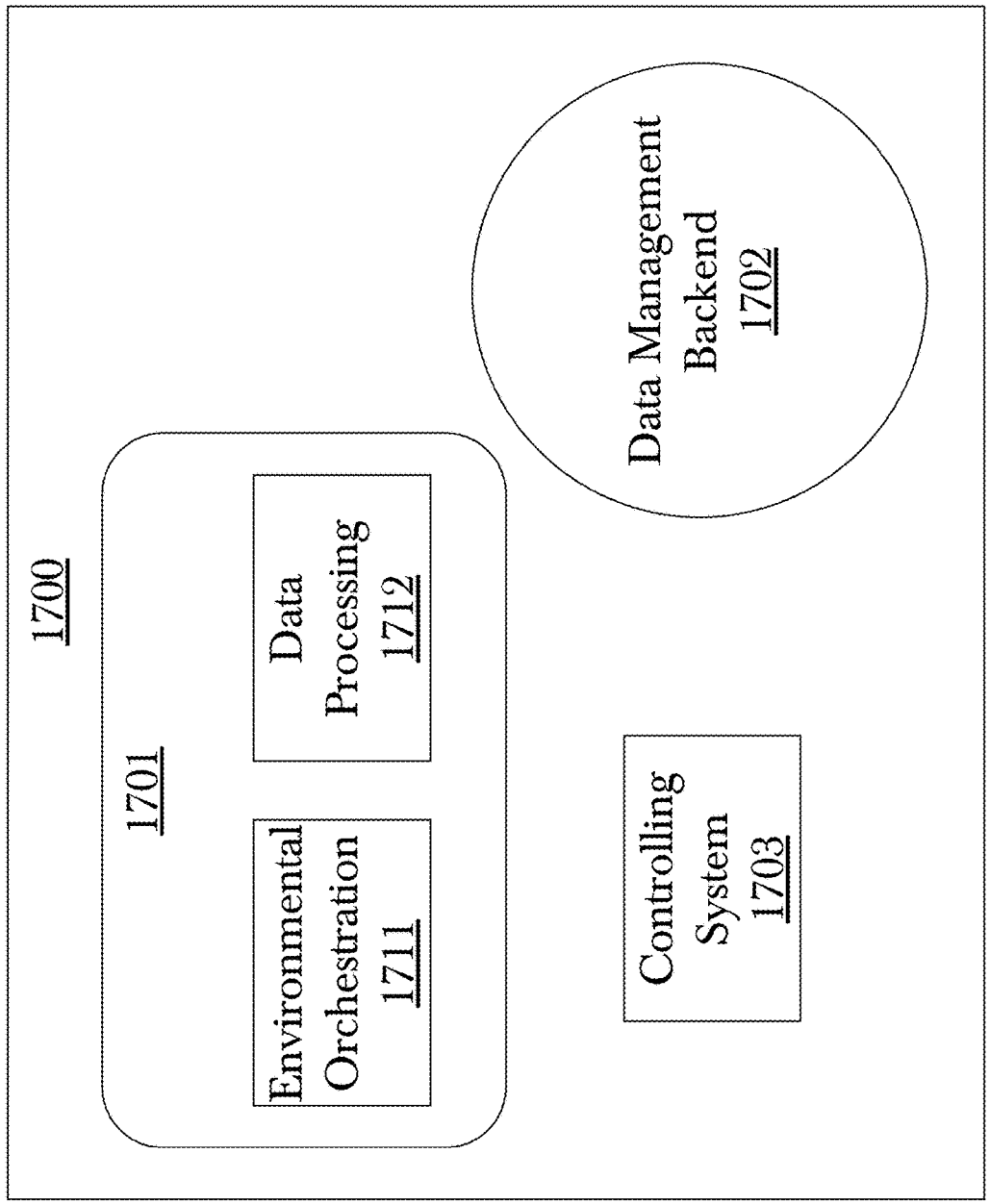

FIG. 17 is a diagram of a computing architecture for a processing system according to one aspect of the present invention.

Figure 18:
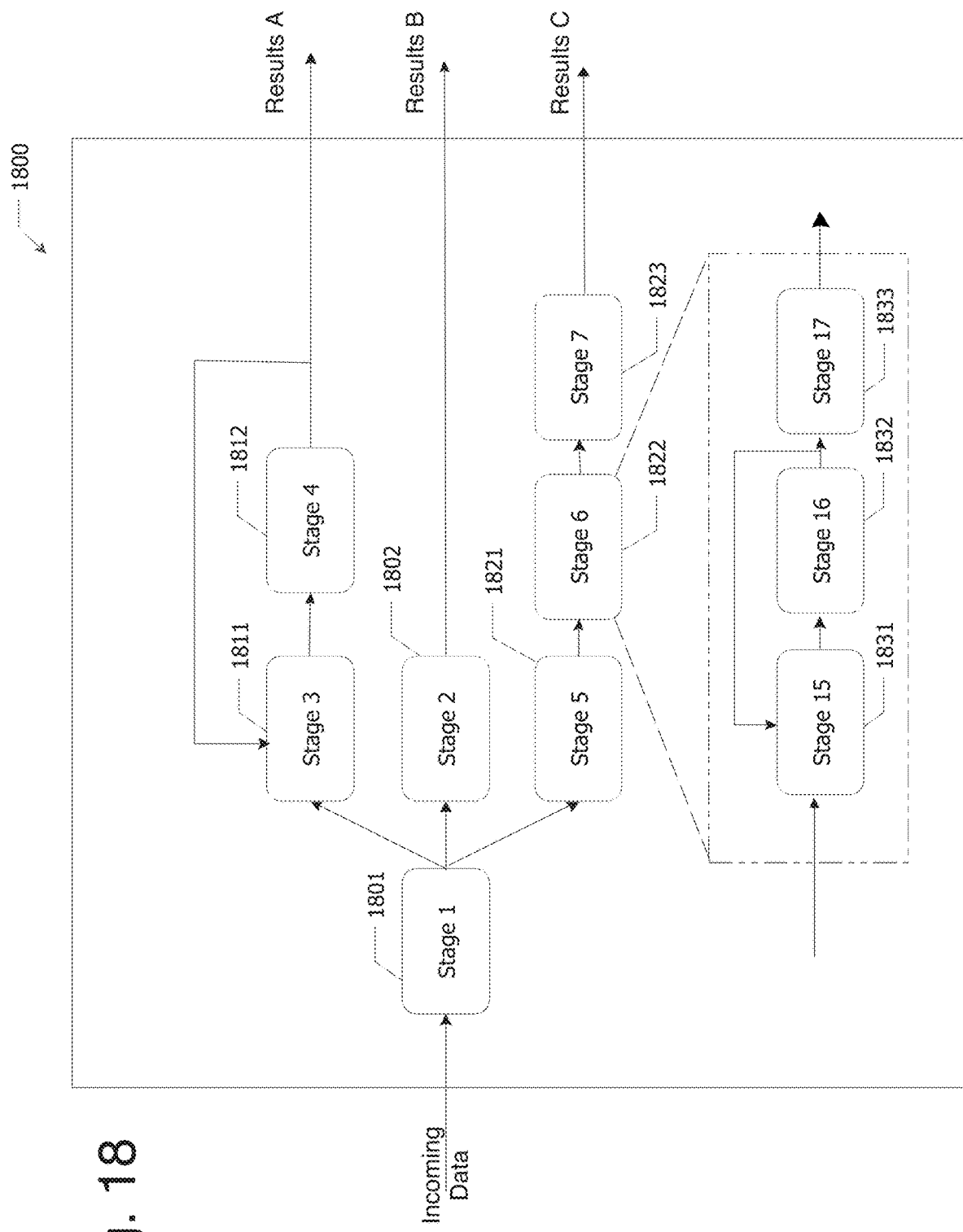
Figure 19:
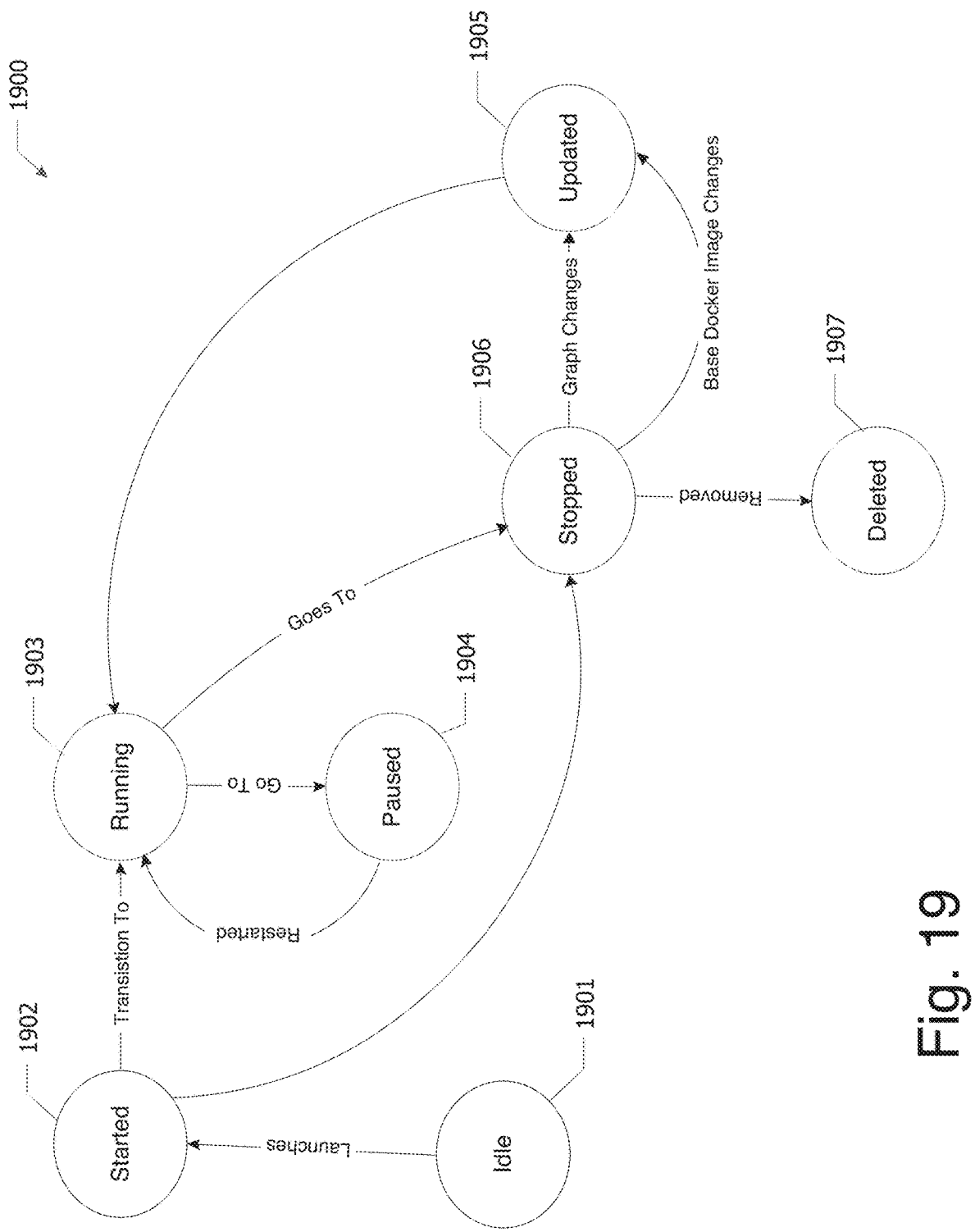

FIG. 18 is a diagram of a computing pipeline architecture for a processing system according to one aspect of the present invention, FIG. 19 is a diagram of a computing operating states for a processing system according to one aspect of the present invention.

Figure 20A:
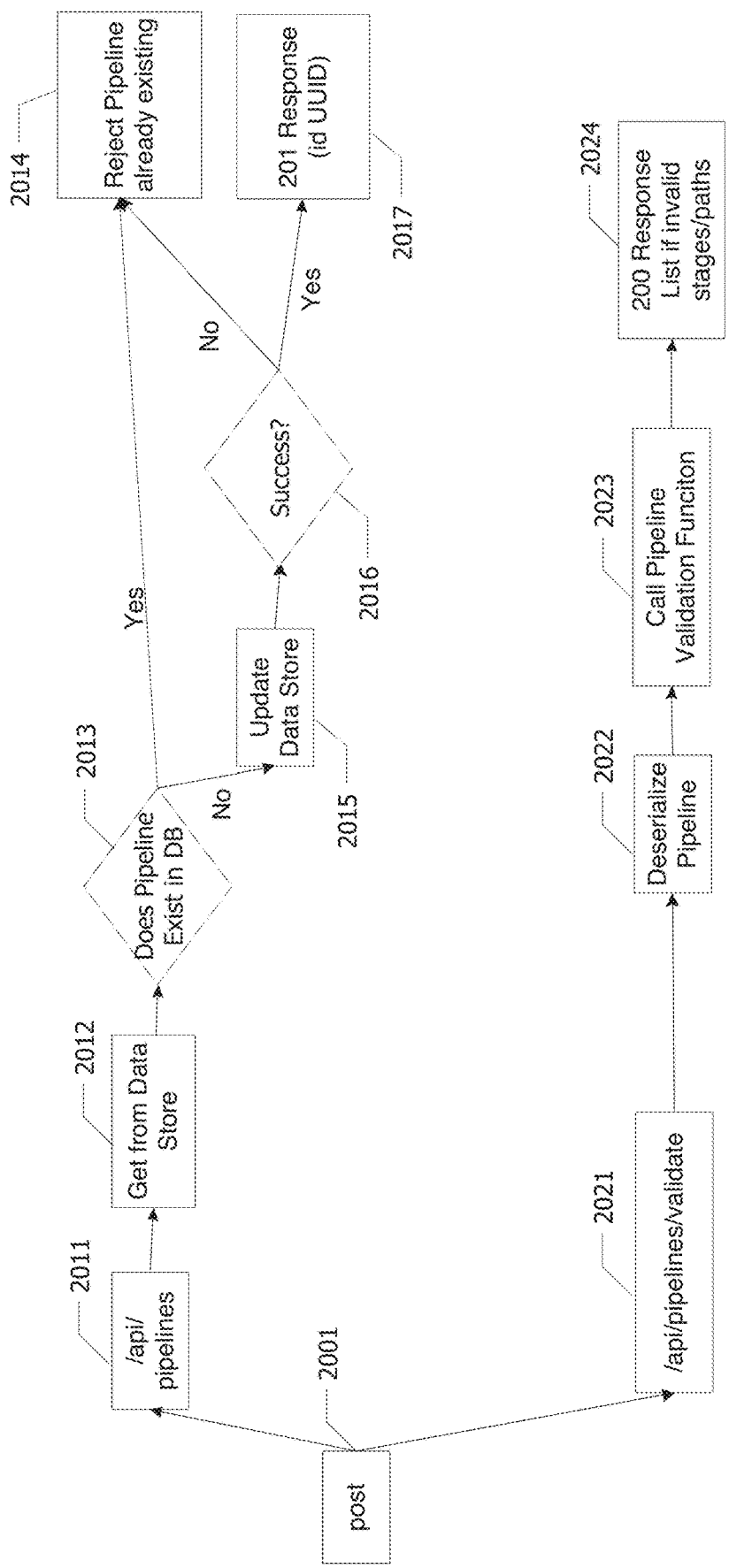
Figure 20B:
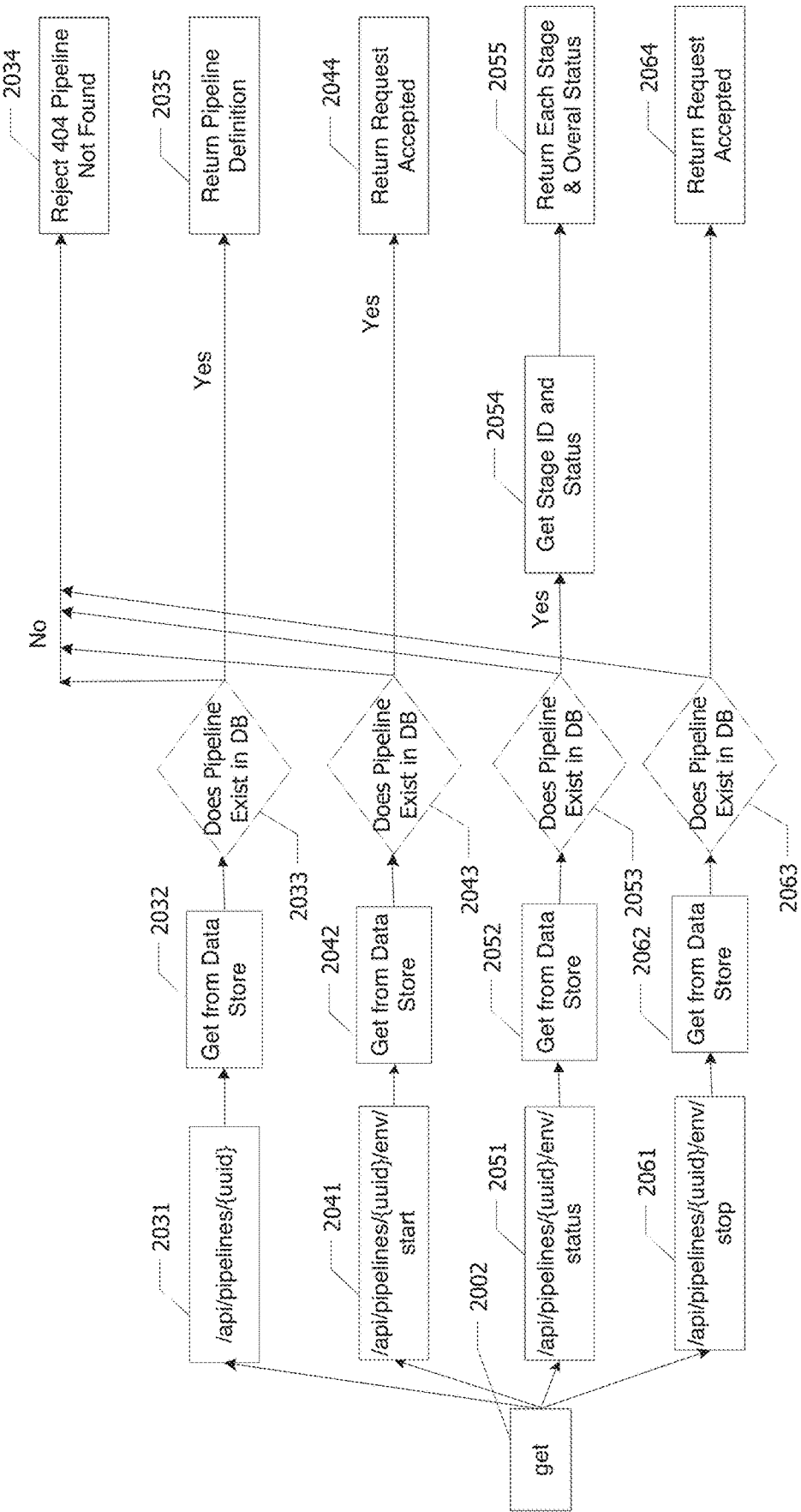
Figure 20C:
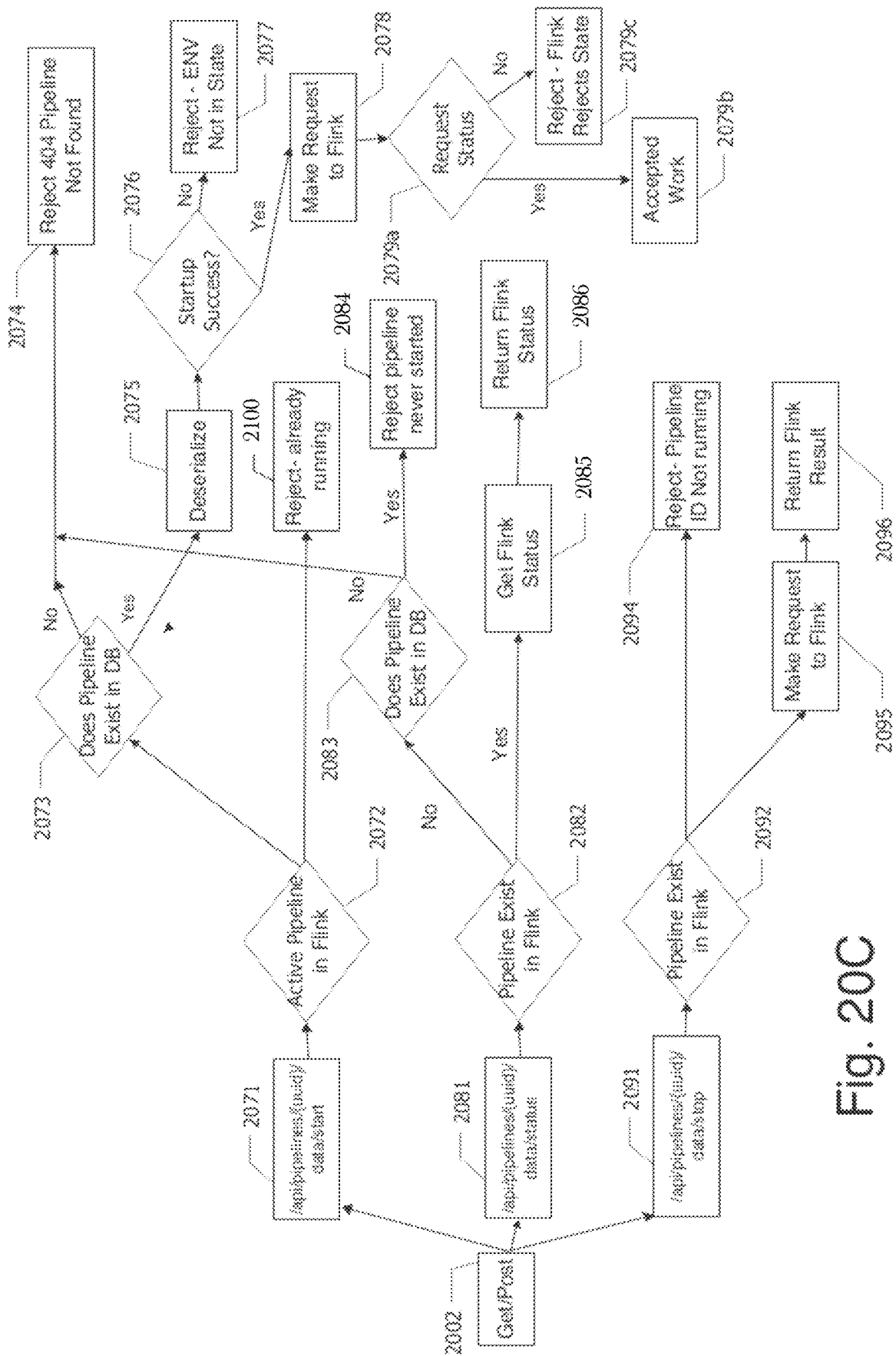
Figure 20D:
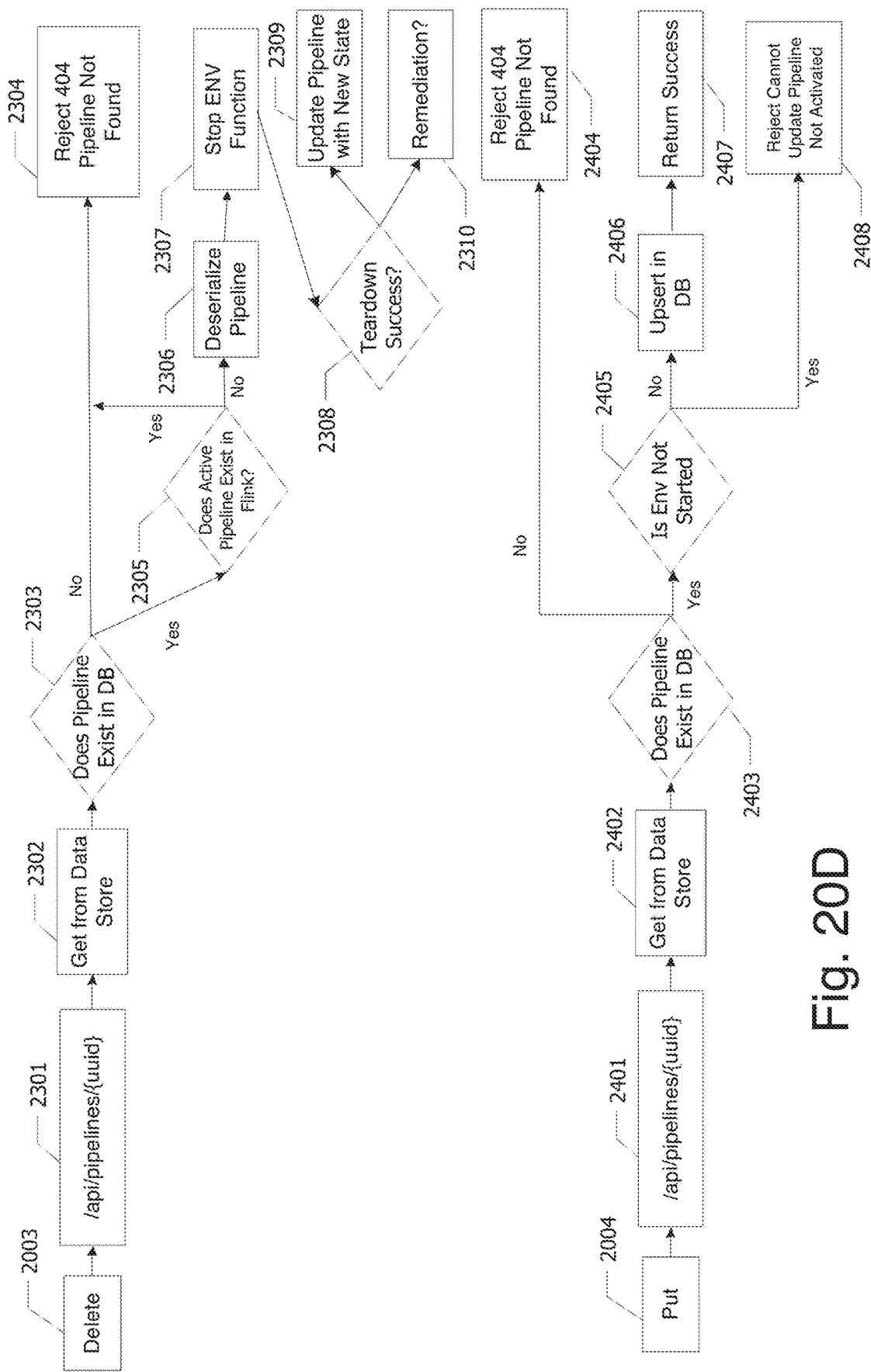
Figure 21:
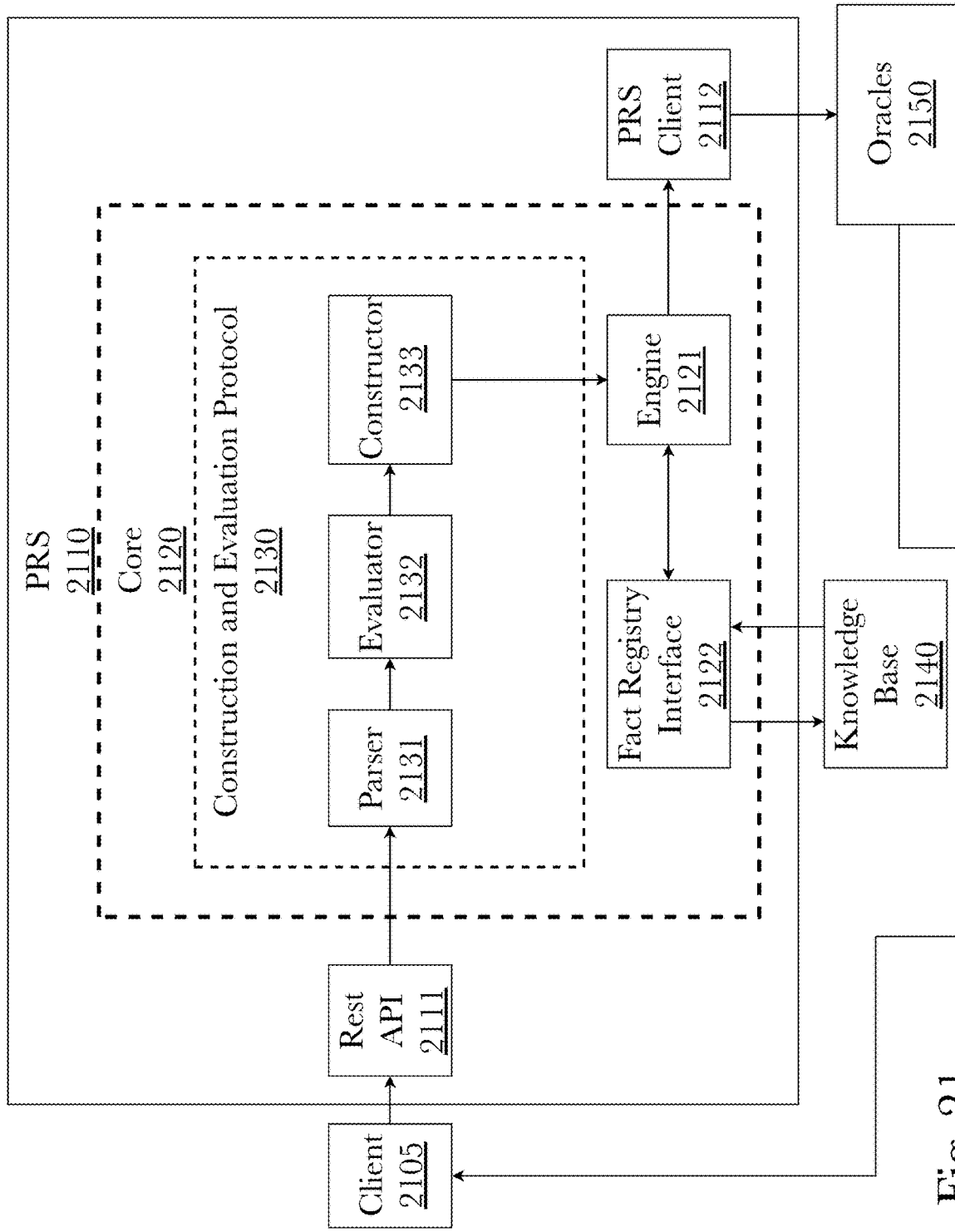

FIG. 20A-20D is a process flow diagram for a set of processing operations used in a pipeline processing system according to one aspect of the present invention, FIG. 21 is a system diagram detailing the components of a Production Rule System (PRS), according to an embodiment.

Figure 22:
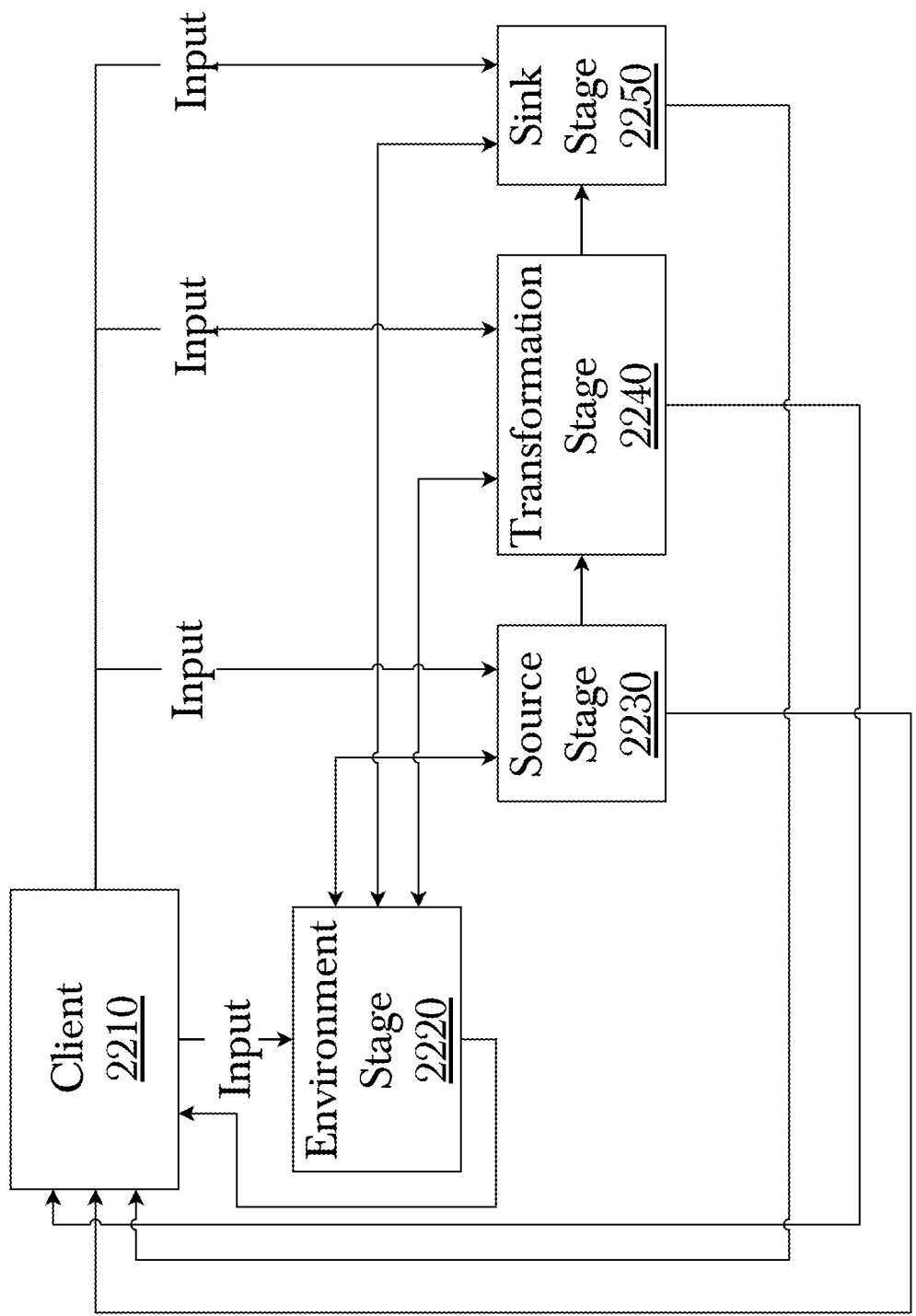

FIG. 22 is a system diagram illustrating cyclic workflow stages in a pipeline of data analysis, according to an embodiment.

DETAILED DESCRIPTION

The inventor has conceived, and reduced to practice, various systems and methods for predictive analysis of very large data sets using a distributed computational graph.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system possibly networked with others in a data processing center, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
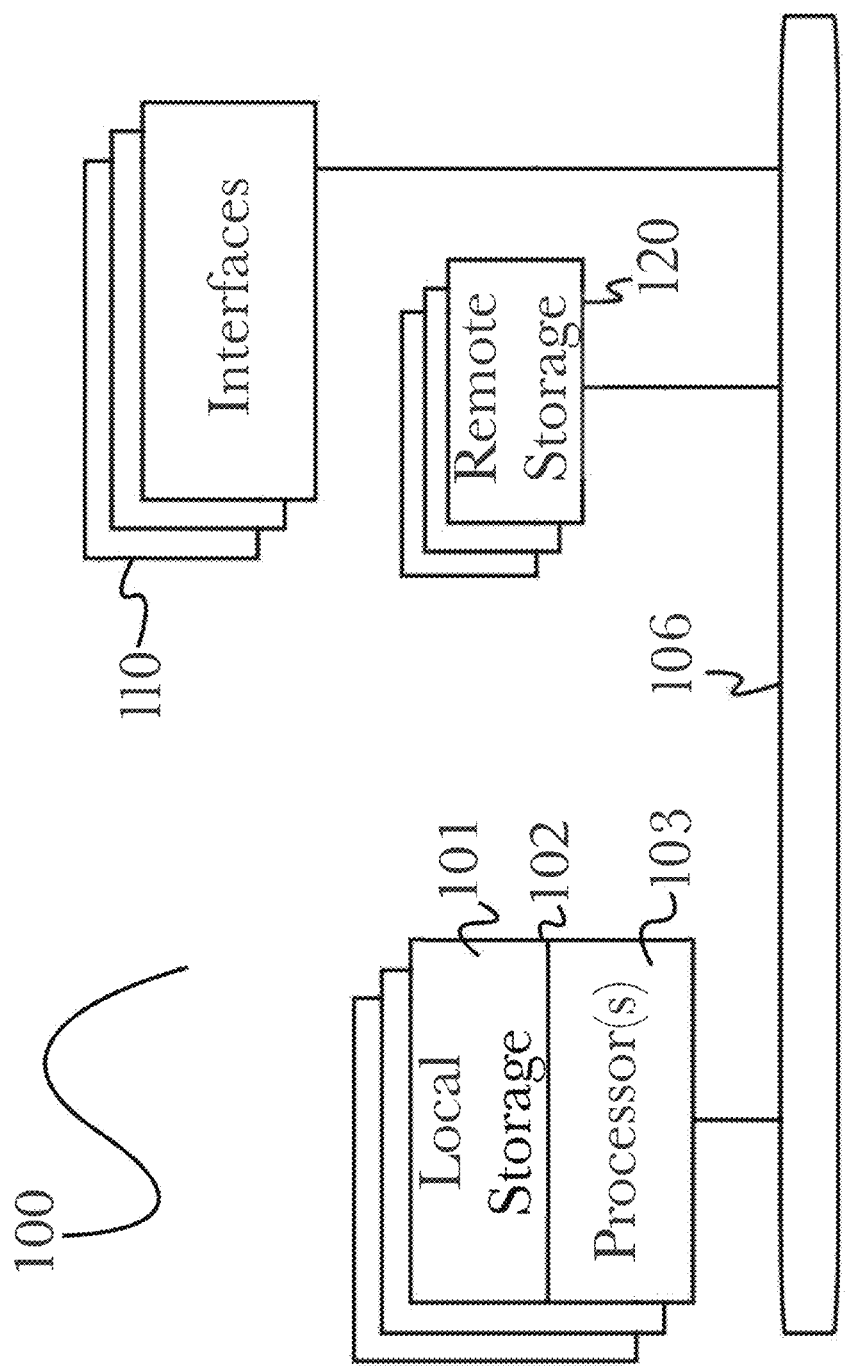
FIG. 1 is a block diagram illustrating an exemplary hardware architecture of a computing device used in various embodiments of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more buses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, LSDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a java compiler and may be executed using a Java virtual machine or equivalent, or files containing higher level code that may be executed by the computer using an interpreter (for example, scripts written in Python, Perl, Ruby, Groovy, or any other scripting language).

Figure 2:
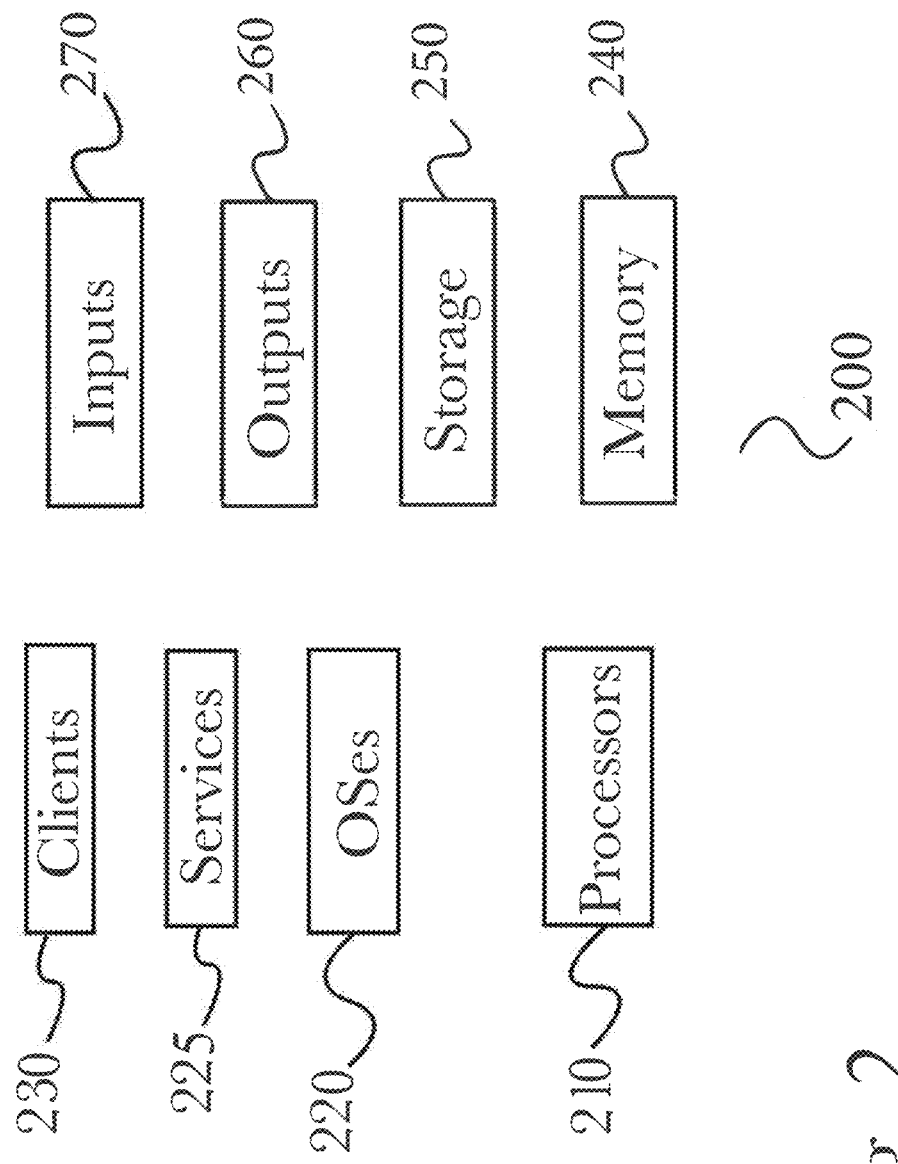
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
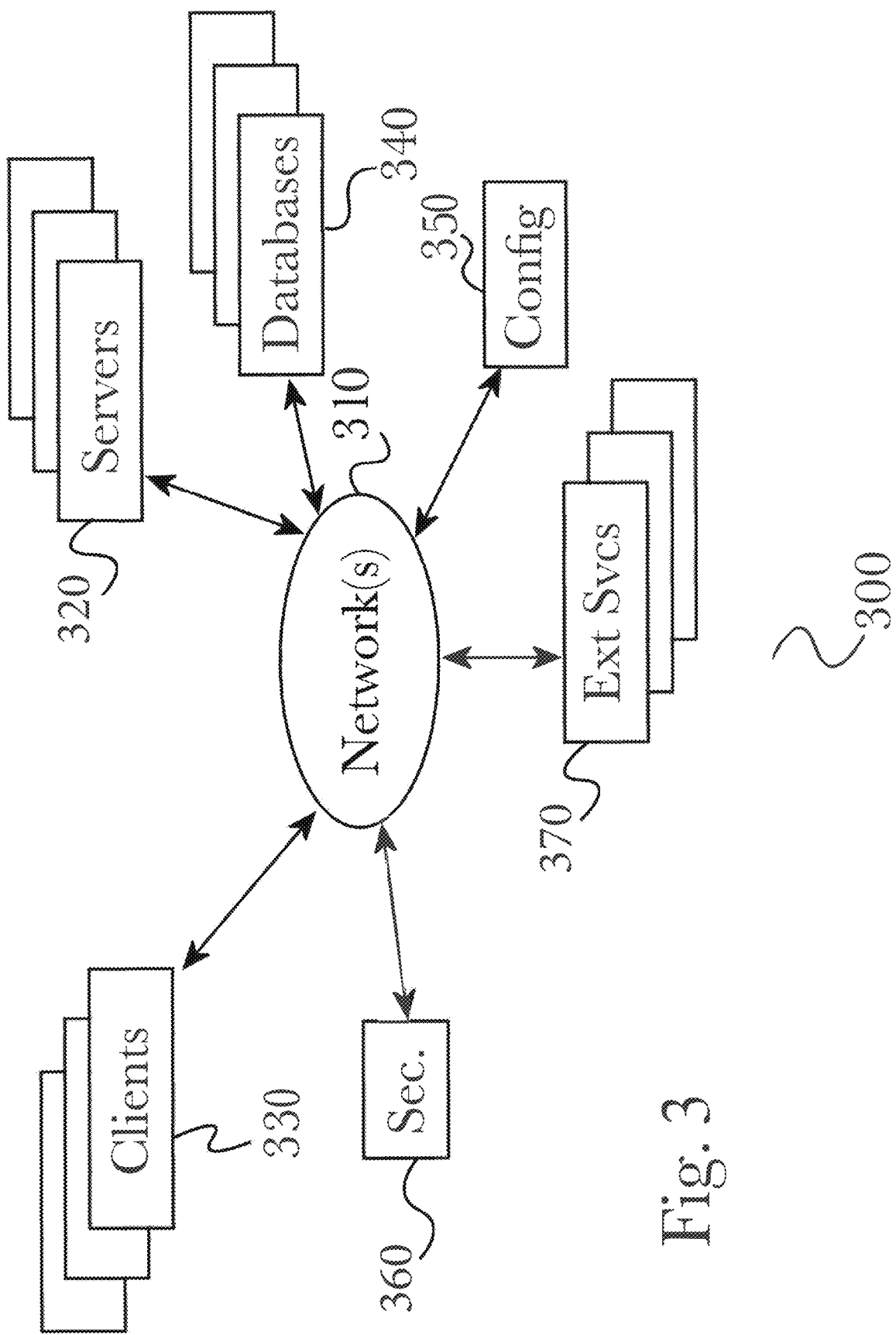
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means.

For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, key-value stores, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (PI) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 5 is a block diagram of an exemplary architecture for a system 500 for predictive analysis of very large data sets using a distributed computational graph. According to the embodiment, streaming input feeds 510 may be a variety of data sources which may include but are not limited to the internet 511, arrays of physical sensors 512, database servers 513, electronic monitoring equipment 514 and direct human interaction 515 ranging from a relatively few numbers of participants to a large crowd sourcing campaign. Streaming data from any combinations of listed sources and those not listed may also be expected to occur as part of the operation of the invention as the number of streaming input sources is not limited by the design. All incoming streaming data may be passed through a data filter software module 520 to remove information that has been damaged in transit, is misconfigured, or is malformed in some way that precludes use. Many of the filter parameters may be expected to be preset prior to operation, however, design of the invention makes provision for the behavior of the filter software module 520 to be changed as progression of analysis requires through the automation of the system sanity and retrain software module 563 which may serve to optimize system operation and analysis function. The data stream may also be split into two identical sub streams at the data filter software module 520 with one sub stream being fed into a streaming analysis pathway that includes the transformation pipeline software module 561 of the distributed computational graph 560. The other sub stream may be fed to data formalization software module 530 as part of the batch analysis pathway. The data formalization module 530 formats the data stream entering the batch analysis pathway of the invention into data records to be stored by the input event data store 540. The input event data store 540 can be a database of any architectural type known to those knowledgeable in the art, but based upon the data model the data store module would be expected to store and retrieve, options using highly distributed storage and map reduce query protocols, of which Hadoop is one, but not the only example, may be generally preferable to relational database schema.

Analysis of data from the input event data store may be performed by the batch event analysis software module 550. This module may be used to analyze the data in the input event data store for temporal information such as trends, previous occurrences of the progression of a set of events, with outcome, the occurrence of a single specific event with all events recorded before and after whether deemed relevant at the time or not, and presence of a particular event with all documented possible causative and remedial elements, including best guess probability information. Those knowledgeable in the art will recognize that while examples here focus on having stores of information pertaining to time, the use of the invention is not limited to such contexts as there are other fields where having a store of existing data would be critical to predictive analysis of streaming data 561. The search parameters used by the batch event analysis software module 550 are preset by those conducting the analysis at the beginning of the process, however, as the search matures and results are gleaned from the streaming data during transformation pipeline software module 561 operation, providing the system more timely event progress details, the system sanity and retrain software module 563 may automatically update the batch analysis parameters 550.

Alternately, findings outside the system may precipitate the authors of the analysis to tune the batch analysis parameters administratively from outside the system 570, 562, 563. The real-time data analysis core 560 of the invention should be considered made up of a transformation pipeline software module 561, messaging module 562 and system sanity and retrain software module 563. The messaging module 562 has connections from both the batch and the streaming data analysis pathways and serves as a conduit for operational as well as result information between those two parts of the invention. The message module also receives messages from those administering analyses 580. Messages aggregated by the messaging module 562 may then be sent to system sanity and retrain software module 563 as appropriate. Several of the functions of the system sanity and retrain software module have already been disclosed. Briefly, this is software that may be used to monitor the progress of streaming data analysis optimizing coordination between streaming and batch analysis pathways by modifying or "retraining" the operation of the data filter software module 520, data formalization software module 530 and batch event analysis software module 540 and the transformation pipeline module 550 of the streaming pathway when the specifics of the search may change due to results produced during streaming analysis. System sanity and retrain module 563 may also monitor for data searches or transformations that are processing slowly or may have hung and for results that are outside established data stability boundaries so that actions can be implemented to resolve the issue. While the system sanity and retrain software module 563 may be designed to act autonomously and employs computer learning algorithms, according to some arrangements status updates may be made by administrators or potentially direct changes to operational parameters by such, according to the embodiment.

Streaming data entering from the outside data feeds 510 through the data filter software module 520 may be analyzed in real time within the transformation pipeline software module 561. Within a transformation pipeline, a set of functions tailored to the analysis being run are applied to the input data stream. According to the embodiment, functions may be applied in a linear, directed path or in more complex configurations. Functions may be modified over time during an analysis by the system sanity and retrain software module 563 and the results of the transformation pipeline, impacted by the results of batch analysis are then output in the format stipulated by the authors of the analysis which may be human readable printout, an alarm, machine readable information destined for another system or any of a plurality of other forms known to those in the art.

FIG. 6 is a block diagram of a preferred architecture for a transformation pipeline within a system for predictive analysis of very large data sets using distributed computational graph 600. According to the embodiment, streaming input from the data filter software module 520, 615 serves as input to the first transformation node 620 of the transformation pipeline. Transformation node's function is performed on input data stream and transformed output message 625 is sent to transformation node 2 630. The progression of transformation nodes 620, 630, 640, 650, 660 and associated output messages from each node 625, 635, 645, 655, 665 is linear in configuration this is the simplest arrangement and, as previously noted, represents the current state of the art. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length 640, 650, 660 as, being distributed, the number of transformations would be limited by the resources made available to each implementation of the invention. It should be further appreciated that there need be no limits on transform pipeline length. Output of the last transformation node and by extension, the transform pipeline 660 may be sent back to messaging software module 562 for predetermined action.

FIG. 7 is a block diagram of another preferred architecture for a transformation pipeline within a system for predictive analysis of very large data sets using distributed computational graph 700. According to the embodiment, streaming input from a data filter software module 520, 705 serves as input to the first transformation node 710 of the transformation pipeline. Transformation node's function is performed on input data stream and transformed output message 715 is sent to transformation node 2 720. In this embodiment, transformation node 2 720 has a second input stream 765. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 760. In an alternative embodiment, a second input stream 760 may contain a specification of data context that is preserved from the first stream into a node 2 720, the shared data context between the inputs of a transformation node 720 allowing the services or streams that send data to a node to share common meaning and enable faster or different methods of processing, including finding correlations or causative tendencies between data from two sources or streams, in the case of a shared data context. It is not required that a secondary, tertiary, or further source of data 760 be functioning as input to specifically the second node in the graph 720, and there may be a plurality of other datastreams feeding into one or several of different nodes in the graph. Functional integration of a second input stream into one transformation node requires the two input stream events be serialized. The invention performs this serialization using a decomposable transformation software module (not shown), the function of which is described below, referring to FIG. 13. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length 710, 720, 730, 740, 750, as, being distributed, the number of transformations and their outputs 715, 725, 735, 745, would be limited by the resources made available to each implementation of the invention. It should be further appreciated that there need be no limits on transform pipeline length. Output 755 of the last transformation node and by extension, the transform pipeline, 750 may be sent back to messaging software module 562 for pre-decided action.

FIG. 8 is a block diagram of another preferred architecture for a transformation pipeline within a system for predictive analysis of very large data sets using distributed computational graph 700. According to the embodiment, streaming input from a data filter software module 520, 805 serves as input to the first transformation node 810 of the transformation pipeline. Transformation node's function is performed on input data stream and transformed output message 815 is sent to transformation node 2 820. In this embodiment, transformation node 2 820 sends its output stream 825, 860 to two transformation pipelines 830, 840, 850; 865, 875. This allows the same data stream to undergo two disparate, possibly completely unrelated, analyses without having to duplicate the infrastructure of the initial transform manipulations, greatly increasing the expressivity of the invention over current transform pipelines and facilitates greater efficiency as workloads can be distributed across the available infrastructure without manual specification from an end user. Functional integration of a second output stream from one transformation node 820 requires that the two output stream events be serialized. The invention performs this serialization using a decomposable transformation software module (not shown), the function of which is described below, referring to FIG. 14. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in pipelines, which may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent function of another transformation pipeline. It should be appreciated that the node number of transformation pipelines and their outputs 815, 825, 835, 845, 855, 860, 870, 880 depicted in no way confines the transformation pipelines employed by the invention to an arbitrary maximum length 810, 820, 830, 840, 850; 865, 875 as, being distributed, the number of transformations would be limited by the resources made available to each implementation of the invention. Further according to the embodiment, there need be no limits on transform pipeline length. Output of the last transformation node and by extension, the transform pipeline 850 may be sent back to messaging software module 562 for contemporary enabled action.

FIG. 9 is a block diagram of another preferred architecture for a transformation pipeline within a system for predictive analysis of very large data sets using distributed computational graph 700. According to the embodiment, streaming input from a data filter software module 520, 905 serves as input to the first transformation node 910 of the transformation pipeline. Transformation node's function may be performed on an input data stream and transformed output message 915 may then be sent to transformation node 2 920. Likewise, once the data stream is acted upon by transformation node 2 920, its output is sent to transformation node 3 930 using its output message 925 In this embodiment, transformation node 3 930 sends its output stream back to transform node 1 935, 910 forming a cyclical relationship between transformation nodes 1 910, transformation node 2 920 and transformation node 3 930. Upon the achievement of some gateway result, the output of cyclical pipeline activity may be sent to downstream transformation nodes within the pipeline 940, 945. The presence of a generalized cyclical pathway construct allows the invention to be used to solve complex iterative problems with large data sets involved, expanding ability to rapidly retrieve conclusions for complicated issues. Functional creation of a cyclical transformation pipeline requires that each cycle be serialized. The invention performs this serialization using a decomposable transformation software module (not shown), the function of which is described below, referring to FIG. 15. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will appreciate that certain transformations in pipelines, may be entirely self-contained; certain transformations may involve direct human interaction 630, such as selection via dial or dials, positioning of switch or switches, or parameters set on control display, all of which may change during analysis; still other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent the cumulative function of another transformation pipeline. It should be appreciated that the node number of transformation pipelines depicted in no way confines the transformation pipelines employed by the invention to an arbitrary maximum length 910, 920, 930, 940, 950; 965, 975 as, being distributed, the number of transformations would be limited by the resources made available to each implementation of the invention. It should be further appreciated that there need be no limits on transform pipeline length. Output of the last transformation node 960 and by extension, the transform pipeline 955 may be sent back to messaging software module 562 for concomitant enabled action.

FIG. 17 is a diagram of a computing architecture for a processing system according to one aspect of the present invention. An environmental orchestration and data processing engine 1700 permits domain experts to directly capture their knowledge via a user interface with domain agnostic building blocks. These modular components can be built and extended by programmers to satisfy a number of use cases without a need to understand how they will be used in a business specific implementation. An Environmental Orchestration component 1711 and Data Processing component 1712, coupled together 1701, allow for both flexibility and tight coupling between all the actions needed to set up resources and perform analytical tasks.

The processing tasks are divided between data processing, orchestration, and system tasks. The data processing tasks provide a plug and play style data processing backend and orchestrates work against that backend. In a preferred embodiment, a data management backend 1702 provides the backend processing functionality that consumes data streams for processing. A variety of data management and stream processing backends may be utilized, including APACHE FLINK™, SPARK™, and APACHE BEAM™.

Data streams may use JavaScript Object Notation (SON) as a lightweight data-interchange format that is easy for humans to read and write, as well as for machines to parse and generate. It is based on a subset of the JavaScript Programming Language, Standard ECMA-262 3rd Edition—December 1999. JSON is a text format that is completely language independent but uses conventions that are familiar to programmers of the C-family of languages, including C, C++, C#, Java, JavaScript, Perl, Python, and many others.

For example, a data management backend 1702 is a framework and distributed processing engine for stateful computations over unbounded and bounded data streams, a data management backend 1702 has been designed to run in all common cluster environments, perform computations at in-memory speed and at any scale. a data management backend's architecture may use both Process Unbounded and Bounded Data. Any kind of data is produced as a stream of events. Credit card transactions, sensor measurements, machine logs, or user interactions on a website or mobile application, all of these data are generated as a stream. Data can be processed as unbounded or bounded streams.

Unbounded streams have a start but no defined end. They do not terminate and provide data as it is generated. Unbounded streams must be continuously processed, i.e., events must be promptly handled after they have been ingested. It is not possible to wait for all input data to arrive because the input is unbounded and will not be complete at any point in time. Processing unbounded data often requires that events are ingested in a specific order, such as the order in which events occurred, to be able to reason about result completeness.

Bounded streams have a defined start and end. Bounded streams can be processed by ingesting all data before performing any computations. Ordered ingestion is not required to process bounded streams because a bounded data set can always be sorted. Processing of bounded streams is also known as batch processing. Pipelines and stages herein may utilize both types of data.

Orchestration tasks directly handle serializing the Pipeline and Stages, monitoring of active Pipelines and submission of new Pipelines, as well as making requests to 3rd parties for resources to be allocated as needed. These resources may be provided within a single system, a collections of interconnected processing systems operating together within a data centers, and cloud based resources provided by parties over the internet such as Amazon Web Services and Microsoft Azure. All similar could computing services may be used to provide all or part of a pipeline's stages as needed with data being transferred by addressing the particular resources by its IP address.

System tasks include monitoring, metadata and recovery tasks to provide hooks between a pipeline and the controlling system 1703 itself to enable it to monitor, pull metadata about multiple pipelines running in sequence and facilitate recovery when pipelines fail, or services that fail. These tasks are needed because the controlling system 1703 does not possess a direct feed into the data as it is being processed.

While APACHE FLINK™ is one of many streaming data processing engines, one of ordinary skill in the art will recognize that API's used to construct the states typically provide functionality that is extensible enough to utilize other processing engines of streaming data such as SPARK™, APACHE BEAM™, and similar stream data processing engines. Additionally, data sinks and data sources may occur any place in the directed graph. Each data sink and data source may be specified by a declarative formalism embodiment within a workflow such that an entire orchestration workflow may be expressed within the overall workflow.

This architecture permits the various stages in a workflow to be modularly constructed in which each stage is separately implemented using a declarative definition of a streaming analytics processing workflow. As long as a stage accepts and consumes and then generates and produces a data stream in a common format, any implementation of a particular stage may be used.

FIG. 18 is a diagram of a computing pipeline architecture for a processing system according to one aspect of the present invention. The unit by which this is measured is a Pipeline 1800. A pipeline 1800 represents a business use case and is the high level application. Different pipelines, as well as components within a pipeline, can work in tandem, allowing for even larger logical applications to be made. Pipelines are constructed of more primitive types called stages. For example, a pipeline shown in FIG. 18 illustrates a sequence of stages running in parallel. All incoming state is obtained by a source stage, stage 1 1801. This data is provided to three separate sequences of stages, stage 4 1811-1812, stage 2 1802, and stages 5-7 1821-1823. Each of these stages may be processing and sink stages as three sets of results are generated.

A pipeline 1800 is defined as a computing structure for housing for all the Stages used to construct the pipeline, where the pipeline of stages is represented as a DG (Directed Graph). This has three basic states, running, suspended, deleted. The difference between suspended and deleted is that the suspended state stops processing but doesn't trigger the post conditions, while deleted stops the processing and triggers the post conditions. Pipelines are comprised of four types of Stages.

Pipeline 1800 may also be constructed using cyclic workflows of stages 3-4 1811-1812 and stages 15-16 1831-1832. These cyclic workflows may be created using the same messaging fabric in a source/sink used to define all other workflows. This arrangement makes the expressive capability of this streaming analytics engine a full directed graph rather than merely directed acyclic graphs of competing formalisms. One possible example of a cycle would be to have a source stage that consumes from a Kafka topic while a separate sink stages passes messages to the same Kafka topic, thus creating a cycle.

An alternative arrangement and use of the workflow stages is to functionally decompose the workflow stages, and allow them to be embedded in other workflows as single stages, for instance having a workflow with steps A, B, C, and D, embedding another 3-step workflow with steps E, F, and G, inbetween steps B and C, such that the first workflow of processing data is now comprised of steps A, B, (E, F, G), C, and D. This modularity and functional decomposition of data workflows comprises a possible alternative arrangement of the disclosed system, but is not limiting or the only alternative arrangement that may be possible.

Environmental Conditions correspond parameter and processing conditions a stage is going to need exist to be able to run in processing components. This also includes the reverse process. These are known as the Setup and Teardown Phase. These Conditions are defined by the Stage itself. Environment Stages are a specialized type of stage that contains only these post-conditions and pre-conditions.

Stages a simple processing task before the processing of a particular set of data is passed to another stage to perform a next step in the process. This architecture provides separate units of work that may be arranged conceptually for users of this system. This architecture also provides a mechanism for a level of abstraction for the operations performed by every stage, such as health metrics and alerting. Stages come in three basic flavors: source stage, transformation stage, and sink stages. A source stage controls how a pipeline getting its data, including its source location, format, and similar conditions. A transformation stage performs operations to manipulating the data received by the pipeline from a source stage. A sink stages controls where any resulting data is stored following its processing through a pipeline, which also includes its location, format, and similar conditions. Additionally, environment stages may also be part of a pipeline. These stages define and manipulate operating conditions defined above as environmental conditions.

A stage, such as stage 6 1822, within pipeline 1800 may itself be constructed using a workflow defined in exactly the same way. Data enters stage 15 1831 as a data stream and exits as a data stream in which the number of processing steps implemented as a separately defined workflow pipeline used as modular stage element. Downstream stages, such as stage 7 1823, does not know whether the data it receives is from a self-contained implementation of stage 6 1822, or from an embedded workflow such as from stage 17 1833. Hierarchical arrangements of workflows in such a manner permits construction of complex workflow from a combination of less complex workflows. All of this configuration of workflows may be defined in the declarative form described herein, and may use stages implemented in different backend processing engines such as Flink, Spark, Beam or similar data streaming processing technologies.

In order to support such modular functionality, workflow pipeline 1800 utilizes a common data context permitting easy data exchange and integration of stages implemented in the various processing engines without complication. As noted above, use of a common data exchange format, such as JSON, will assist this modularity. Also, data may be specified using a common set of terms to permit ease of interoperability. A simple example would be to transform all incoming data streams into a standard set of values. For example, data such as distance, temperature, and time (zone) may be provided in various units. By transforming the data into a common set of units, all workflows may interoperate without issue. Data may be retransformed into a set of units useful by a user once the processing is otherwise completed.

It is possible to use the disclosed system, for instance, for the purposes of Complex Event Processing (CEP), which entails real-time processing of event datastreams, through the use of workflow pipelines to extract and analyze important data from a datastream to determine characteristics about an event.

FIG. 19 is a diagram of a computing operating states 1900 for a pipeline according to one aspect of the present invention. A pipeline 1800, and its component stages, will operate in one of a set of possible operating states. The pipeline begins in an idle state 1901 once it has been loaded into computing resources. No data processing operations occur in this state. The pipeline next enters a started state 1902 when the pipeline is launched. From here, the pipeline can transition to a running state 1903 to go to a stopped state 1906. Data is processed through each of the stages in the pipeline while in the running state 1903.

When a set of data has been completely processed, the pipeline can go to a paused state 1904 or a stopped state. In both cases, data processing is halted. From a paused state 1904, the data processing may resume from its last point in the data by restarting the pipeline to return it to a running state 1903.

From a stopped state 1906, the pipeline may enter a deleted state 1907 when its stages and computing components are removed from the computing resources. The pipeline enters an updated state 1905 either when changes are made to the existing graph defining the data flow within the pipeline or when a base docker image used to create the pipeline changes that requires changing to existing pipelines. The stopped pipeline is reconfigured in the update state to permit the new definition for the pipeline to operate on data when the pipeline returns to a running state 1903 from the update state 1905.

FIG. 21 is a system diagram detailing the components of a Production Rule System (PRS), according to an embodiment. A client 2105 computer connects to a production rule system (PRS) 2110, via a REST API 2111 over a network. A PRS is a rule system which enables many different functionalities, including making external function calls to domain-specific oracles, providing for generalization of semantic and datastream processing rules and preventing rule creep when defining multiple transitivity properties, allowing for scalar value comparisons of data (comparing ages, distances, etc.), allowing for aggregation of facts and rules from different knowledge bases, graphs, or both, allowing for JSON conversion of rules to and from a GraphStack with a universally unique identifier (UUID), providing the ability to instantiate nodes with specified properties in a GraphStack, provide for a message queue through a Command-Line Interface (CLI) or Graphical User Interface (GUI), and rule building through an API, and allowing for new rules and modified rules to be updated with a real-time visualization. A REST API 2111 provides the forward-facing access to PRS 2110 functionality for a client 2105, the PRS further comprising a set of core components 2120 which operate a further set of construction and evaluation protocols 2130. The construction and evaluation protocols include a data parser 2131, data evaluator 2132, and data constructor 2133. The remaining core components 2120 include at least an engine 2121 which drives the overall system and receives semantic data from a data construction component 2133, forwarding processed data to a fact registry interface 2122 and an PRS client 2112. A fact registry interface 2122 may register new data selectively or automatically with a knowledge base 2140 which includes a directed knowledge graph and a multidimensional time series database (MDTSDB), and communicate registered data and the result of attempts to register new data with the PRS engine 2121. An PRS engine 2121 operates the construction and evaluation protocols 2130 to parse data sent through the REST API 2111, and sends results and further queries for backend oracles 2150 to a PRS client 2112. An PRS client 2112 represents the PRS system 2110 communicating with backend oracles 2150 which in turn send the results of these modified queries to the client 2105, thus completing the cycle and allowing the rule system 2110 to act as a modular, integrable front-end to other systems for semantic data and API call processing. As an example of a type of rule that might be created by the PRS, the PRS may declaratively specify windowed rules, wherein rules may be established for events occurring within a given time window. For example, a windowed rule may be established that counts the number of login attempts made within a two-minute time window. The window may be a "tumbled" or "sliding" window that repeatedly refreshes on a periodic basis to apply the rule to the time window just prior to the refresh.

It is possible to use the disclosed system, for instance, for the purposes of Complex Event Processing (CEP), which entails real-time processing of event datastreams, through the use of workflow pipelines to extract and analyze important data from a datastream to determine characteristics about an event.

Exactly-once semantics settings may be preserved according to some embodiments when registering a new fact or datapoint 2122 in a knowledge base 2140, such that appearance of one semantically similar or identical datapoint in future processed data may achieve idempotency and cause an effect in the system only the first time it is encountered, but not subsequent times, such as when certain forms of machines have an "ON" and "OFF" switch respectively, wherein the "ON" switch does not perform any other actions after being pressed an initial time, until the device is turned "OFF." For instance, an event datastream may be processed with semantic learning and examination that contains reference to a temperature of 72 degrees in a specific geographical area. If that same information is processed again, with exactly-once semantics enabled for this datapoint, then subsequent occurrences of the same area having 72 degrees of temperature will not cause a change in the system or a new event to be catalogued, until the temperature in that area changes to something other than 72, such as 71, at which point the temperature shifting back to 72 will constitute a logged event. In other embodiments, the idempotency may mean that even after a change from the exactly-once occurrence, the occurrence will not trigger a new event.

The oracles 2150 may comprise any plurality or combination of services and technologies and components, which are utilized for database storage and data stream processing, which the PRS 2110 may communicate with to help with backend processing. According to an embodiment, a database may be included either in the oracles 2150 backend or in the knowledge base 2140, or both, to support the integration of fixed-point rule semantics, providing for analysis of data and semantic data especially by comparison to a fixed point after refinement using machine learning.

FIG. 22 is a system diagram illustrating cyclic workflow stages in a pipeline of data analysis, according to an embodiment. A client 2210 system sends a query or batch of data for processing to one of four possible workflow stages, either an environmental stage 2220, a source stage 2230, a transformation stage 2240, or a sink stage 2250. All workflow stages may feed into other workflow stages as shown by directional arrows, or at any point may forward the data from processing in the specified workflow stage back to the client for viewing, without forwarding to another workflow stage. Notably, an environmental data stage 2220 is the only workflow stage capable of transmitting data as-needed between all three of the other workflow stages. An environmental workflow stage is utilized when environmental variables, settings, and initializations must be set, for instance initialization of other workflow stages, or of knowledge graph nodes, or other environmental attributes of interest. A source stage of workflow 2220 is where data is analyzed to determine, broadly speaking, the origin and acquisition of the data, before either returning the result of the workflow immediately to the client 2210 or continuing to a transformation stage 2240. A transformation stage of workflow 2240 is where data may be manipulated, and represents such workflow steps and functionality as starting a data pipeline, shutting down a data pipeline, and editing a data pipeline for the flow and processing of data as required. This stage of the workflow may return to the client 2210 or continue on to a data sink stage 2250, which includes functions regarding where to put or send data after processing, or where to send data as received directly from a client 2210. The workflow diagram as shown illustrates a cyclical nature wherein data and operations can be accomplished in one of several workflow stages, forwarded either to another workflow stage or returned back to the client, and repeated, until a client no longer desires to operate according to the defined workflow.

A novel, declarative domain-specific language (DSL) may be utilized in the workflow cycle. According to a preferred embodiment, several functions of a novel DSL may be utilized, including a capability for bidirectional dependencies on operations (for instance, "A→B" may be used to specify B depending on A before executing, or "B←A" for the same), channel or domain-specific directional dependencies (for instance, "A→("EXAMPLE", B)" may be interpreted as B has a dependency on A's EXAMPLE signal, channel, or argument), multi-argument support (for instance, "A→(set("EXAMPLE", "EXAMPLE 2"), B)), and may be modular, for new language definitions and uses to be defined as needed.

Description of Method Embodiments

FIG. 10 is a process flow diagram of a method 1000 for predictive analysis of very large data sets using the distributed computational graph. One or more streams of data from a plurality of sources, which includes, but is in no way not limited to, a number of physical sensors, web based questionnaires and surveys, monitoring of electronic infrastructure, crowd sourcing campaigns, and direct human interaction, may be received by system 1001. The received stream is filtered 1002 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one sub stream may be sent for batch processing 1600 while another sub stream may be formalized 1003 for transformation pipeline analysis 1004, 561, 600, 700, 800, 900. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the embodiment, individual transformations can receive input of expected form from more than one source 1300 or receive no input at all as would a transformation acting as a timestamp. According to the embodiment, individual transformations, may not modify the data as would be encountered with a data store acting as a queue for downstream transformations 1303, 1305, 1405, 1407, 1505. According to the embodiment, individual transformations may provide output to more than one downstream transformation 1400. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical 1500, where the output of one of the internal transformations serves as the input of one of its antecedents allowing recursive analysis to be run. The result of transformation pipeline analysis may then be modified by results from batch analysis 1005 of the data stream 1600 and output 1006 in format predesigned by the authors of the analysis with could be human readable summary printout, human readable instruction printout, human-readable raw printout, data store, or machine encoded information of any format known to the art to be used in further automated analysis or action schema.

FIG. 11 is a process flow diagram of a method 1100 for an embodiment of modeling the transformation pipeline module 561 of the invention as a directed graph using graph theory. According to the embodiment, the individual transformations 1102, 1104, 1106 of the transformation pipeline $t_1 \ldots t_n$ such that each $t_i$ T are represented as graph nodes. Transformations belonging to T are discrete transformations over individual datasets $d_1$, consistent with classical functions. As such, each individual transformation $t_j$, receives a set of inputs and produces a single output. The input of an individual transformation $t_i$, is defined with the function in: $t_i$ $d_1 \ldots d_k$ such that $in(t_i)=(d_1 \ldots d_k)$ and describes a transformation with k inputs. Similarly, the output of an individual transformation is defined as the function out: $t_j$ $\lfloor 1d_1 \rfloor$ to describe transformations that produce a single output (usable by other transformations). A dependency function can now be defined such that $dep(t_a,t_b)$ $out(t_a)in(t_b)$ The messages carrying the data stream through the transformation pipeline 1101, 1103, 1105 make up the graph edges. Using the above definitions, then, a transformation pipeline within the invention can be defined as G=(V,E) where message $(t_1, t_2 \ldots t_{(n-1)},t_n)V$ and all transformations $t_1 \ldots t_n$ and all dependencies $dep(t_i,t_j)$ 1107.

FIG. 12 is a process flow diagram of a method 1200 for one embodiment of a linear transformation pipeline 1201. This is the simplest of configurations as the input stream is acted upon by the first transformation node 1202 and the remainder of the transformations within the pipeline are then performed sequentially 1202, 1203, 1204, 1205 for the entire pipeline with no introduction of new data internal to the initial node or splitting output stream prior to last node of the pipeline 1205. The result of the transformation pipeline is then sent back out to any message and output processes 1206. This configuration is the current state of the art for transformation pipelines and is the most general form of these constructs. Linear transformation pipelines require no special manipulation to simplify the data pathway and are thus referred to as non-decomposable. The example depicted in this diagram was chosen to convey the configuration of a linear transformation pipeline and is the simplest form of the configuration felt to show the point. It in no way implies limitation of the invention.

FIG. 13 is a process flow diagram of a method 1300 for one embodiment of a transformation pipeline where one transformation node 1307 in a transformation pipeline receives data streams from two source transformation nodes 1301. The invention handles this transformation pipeline configuration by decomposing or serializing the input events 1302-1303, 1304-1305 heavily relying on post transformation function continuation. The results of individual transformation nodes 1302, 1304 just antecedent to the destination transformation node 1306 and placed into a single specialized data storage transformation node 1303, 1305 (shown twice as process occurs twice). The combined results then retrieved from the data store 1306 and serve as the input stream for the transformation node within the transformation pipeline backbone 1307, 1308. The example depicted in this diagram was chosen to convey the configuration of transformation pipelines with individual transformation nodes that receive input from two source nodes 1302, 1304 and is the simplest form of the configuration felt to show the point. It in no way implies limitation of the invention. One knowledgeable in the art will realize the great number of permutations and topologies possible, especially as the invention places no design restrictions on the number of transformation nodes receiving input from greater than one sources or the number sources providing input to a destination node.

FIG. 14 is a process flow diagram of a method 1400 for one embodiment of a transformation pipeline where one transformation node 1402 sends output to a second node 1403 in a transformation pipeline, which then may send output data stream to two destination transformation nodes 1401, 1406, 1408 in potentially two separate transformation pipelines. The invention handles this transformation pipeline configuration by decomposing or serializing the output events 1404, 1405-1406, 1407-1408. The results of the source transformation node 1403 just antecedent to the destination transformation nodes 1406 and placed into a single specialized data storage transformation node 1404, 1405, 1407 (shown three times as storage occurs and retrieval occurs twice). The results of the antecedent transformation node may then be retrieved from a data store 1404 and serves as the input stream for the transformation nodes two downstream transformation pipeline 1406, 1408. The example depicted in this diagram was chosen to convey the configuration of transformation pipelines with individual transformation nodes that send output streams to two destination nodes 1406, 1408 and is the simplest form of the configuration felt to show the point. It in no way implies limitation of the invention. One knowledgeable in the art will realize the great number of permutations and topologies possible, especially as the invention places no design restrictions on the number of transformation nodes sending output to greater than one destination or the number destinations receiving input from a source node.

FIG. 15 is a process flow diagram of a method 1500 for one embodiment of a transformation pipeline where the topology of all or part of the pipeline is cyclical 1501. In this configuration the output stream of one transformation node 1504 acts as an input of an antecedent transformation node within the pipeline 1502 serialization or decomposition linearizes this cyclical configuration by completing the transformation of all of the nodes that make up a single cycle 1502, 1503, 1504 and then storing the result of that cycle in a data store 1505. That result of a cycle is then reintroduced to the transformation pipeline as input to the first transformation node of the cycle 1506. As this configuration is by nature recursive, special programming to unfold the recursions was developed for the invention to accommodate it. The example depicted in this diagram was chosen to convey the configuration of transformation pipelines with individual transformation nodes that for a cyclical configuration 1501, 1502, 1503, 1504 and is the simplest form of the configuration felt to show the point. It in no way implies limitation of the invention. One knowledgeable in the art will realize the great number of permutations and topologies possible, especially as the invention places no design restrictions on the number of transformation nodes participating in a cycle nor the number of cycles in a transformation pipeline.

FIG. 16 is a process flow diagram of a method 1600 for one embodiment of the batch data stream analysis pathway which forms part of the invention and allows streaming data to be interpreted with historic context. One or more streams of data from a plurality of sources, which includes, but is in no way not limited to, a number of physical sensors, web based questionnaires and surveys, monitoring of electronic infrastructure, crowd sourcing campaigns, and direct human interaction, is received by the system 1601. The received stream may be filtered 1602 to exclude data that has been corrupted, data that is incomplete or misconfigured and therefore unusable, data that may be intact but nonsensical within the context of the analyses being run, as well as a plurality of predetermined analysis related and unrelated criteria set by the authors. Data formalization 1603 for batch analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The filtered and formalized stream is then added to a distributed data store 1604 due to the vast amount of information accrued over time. The invention has no dependency for specific data stores or data retrieval model. During transformation pipeline analysis of the streaming pipeline, data stored in the batch pathway store can be used to track changes in specifics of the data important to the ongoing analysis over time, repetitive data sets significant to the analysis or the occurrence of critical points of data 1605. The functions of individual transformation nodes 620 may be saved and can be edited also all nodes of a transformation pipeline 600 keep a summary or summarized view (analogous to a network routing table) of applicable parts of the overall route of the pipeline along with detailed information pertaining to adjacent two nodes. This framework information enables steps to be taken and notifications to be passed if individual transformation nodes 640 within a transformation pipeline 600 become unresponsive during analysis operations. Combinations of results from the batch pathway, partial and streaming output results from the transformation pipeline, administrative directives from the authors of the analysis as well as operational status messages from components of the distributed computational graph are used to perform system sanity checks and retraining of one or more of the modules of the system 1606. These corrections are designed to occur without administrative intervention under all but the most extreme of circumstances with deep learning capabilities present as part of the system manager and retrain module 563 responsible for this task.

FIG. 20A-20D is a process flow diagram for a set of processing operations used in a pipeline processing system according to one aspect of the present invention. The controlling system 1703 communicates with and controls the operation of a pipeline using a set of API commands that include Post, Get, Delete, and Put commands. FIG. 20A illustrates the operation of the Post 2001 commands. The Post commands include an api/pipelines post and an api/pipelines/validate commands.

The POSI/api/pipelines is a command having a content type: 'application/json.' This command is the entry point. It creates a new pipeline in the database of pipelines but does not start the pipeline. To start the pipeline, call 'GET . . . /env' and 'GET . . . /data' commands described below. Invalid pipelines may be saved at this point, future calls to this pipeline will be validated as part of the operation of the command.

The command has the following payload fields: 'pipeline;' (required): 'stageGraphBuilder'—a JSON representation of a valid pipeline; (required): 'version'—the system version expected. An error will occur if the manager's version is different; (optional): 'uuid'—If none is provided one will be created and returned in the response payload; (optional): 'name'—A human readable name for the pipeline, uniqueness is not enforced; (optional): 'description'—A description for end users; and (optional): 'tags'—Keywords or terms associated with the pipeline (these tags are stored in an array). In operation the command receives the command 2011 and gets data from the data store 2012 before deciding if the pipeline in question exists 2013 in the database. If it does determine the pipeline exists, this pipeline is rejected 2014 as already existing. If not, the data is data store is updated 2015 and if successful 2016, and a 201 response with and id=UUID is returned 2017.

The POST/api/pipelines/validate is a command having a content type: 'application/json.' This command validates a pipeline. A pipeline with no environmental stages and no data processing stages is considered invalid. The command uses payload fields: 'pipeline' (required): See ['POST/api/pipelines'](#post-apipipelines). An example response is:

Example response (200 OK):

```
{
    "pipelineId":"038bf27f-52f0-40cf-95db-b70b83ade772"
    "invalidStages":[ ],
    "statusCode":200
}
```

The command is received 2021 and the pipeline is deserialized 2022 and a pipeline validation call is made 2023. A response 200 is returned with a list if invalid stages and paths are found 2024.

FIGS. 20B and 20C illustrate the operation of a set of Get 2002 and Post commands. APACHE FLINK™ will be used throughout the figures to refer to a data management backend. The GET/api/pipelines?tag=A&tag=B' is a command having a content type: 'application/json.' This command gets the pipelines that are associated with the provided tag(s). An example response (200 OK):

```
{
    "pipelineId":null,
    "data":[
        {
            "name":"pipeline1",
            "description":null,
            ...
        },
        {
            "name":"pipeline2",
            "description":null,
            ...
        }
    ],
    "statusCode":200
}
```

The GET/api/pipelines/{uuid} command is a command having a content type: 'application/json.' The command gets the pipeline previously posted pipeline from the database. The command is received 2031 and data is obtained from the data store 2032. If the pipeline exists 2033 in the data base, a pipeline definition is returned 2035; otherwise a reject 404 pipeline not found is returned 2034.

The POST/api/pipelines/{uuid}/env/start is a command that calls the environmental setup for a pipeline. An example response (202 Accepted):

```
{
    "pipelineId":"2db14f86-29c4-4067-a7ac-e05c24035c3a",
    "data":"Environmental setup for pipeline
    [2db14f86-29c4-4067-a7ac-e05c24035c3a] started",
    "statusCode":202
}
```

The command is received 2041 and data is obtained from the data store 2042. If the pipeline exists 2043 in the data base, a request accepted is returned 2044; otherwise a reject 404 pipeline not found is returned 2034.

The POST/api/pipelines/{uuid}/env/status command returns the statuses of the environmental stages. An example response (200 OK):

```
{
    "pipelineId": "51afaae4-ddce-42af-ba0a-f341075e412b",
    "data": [{
        "uuid": "bc63f730-ed89-4124-bae9-c31c378802cc",
        "state": "SUCCESS"
    }, {
        "uuid": "a36dda4e-17fe-4af0-a745-0ea4dc3e948c",
        "state": "SUCCESS"
    }],
    "statusCode": 200
}
```

The command is received 2051 and data is obtained from the data store 2052. If the pipeline exists 2053 in the data base, a stage ID and status is obtained 2054 and returned 2055; otherwise a reject 404 pipeline not found is returned 2034.

The POST/api/pipelines/{uuid}/env/stop command calls the environmental teardown in a pipeline. If the data processing stages are still running when this endpoint is called, this endpoint returns an error. In other words, call 'POST . . . /data/stop' before calling this endpoint. An example response (202 Accepted):

```
{
    "PipelineId":"038bf27f-52f0-40cf-95db-b70b83ade772",
    "data":null,
    "statusCode":202
}
```

The command is received 2061 and data is obtained from the data store 2062. If the pipeline exists 2063 in the data base, a request accepted is returned 2064; otherwise a reject 404 pipeline not found is returned 2034.

The command is received 2071 and a test if an active pipeline exists 2072 in Flink. If the pipeline is not active, and already running rejection is returned 2100; otherwise a test to determine if the pipeline exists 2073 is performed. If the pipeline is not in the database a reject 404 pipeline not found is returned 2074. If the pipeline exists in the database, the pipeline is deserialized 2075. A test to determine if the operation was a success 2076 is performed and if not, a rejection ENV is not in a proper state is returned 2077. If a success was detected, a request to Flink is made 2078 and a status of the request is tested 2079a, If the status is good, the accepted work is returned 2079b; otherwise a Reject Flink rejects pipeline state is returned 2079c.

The POST/api/pipelines/{uuid}/start/all starts both the environmental and the data processing stages in a pipeline. Starts the pipeline from the most recent save point, if one exists. The command uses payload parameters: 'taskmanager-heap-mb'—the amount of heap to allocate to each task manger; 'jobmanager-heap-mb'—the amount of heap to allocate to each job manager. Number of job managers is one; 'taskmanager-slots'—the number of slots to allocate per taskmanager; 'taskmanager-cpu-count'—the number of cpu cores to allocate per task manager, 'jobmanagercpu-count'—the number of cpu cores to allocate to the job manager; 'job-parallelism'—the number of parallel instances to run at once; (optional) 'job-checkpoint-timeout-seconds'—(default: 600) the number of seconds before checkpoints or savepoint is considered failed; (optional) 'job-checkpoint-pause-seconds'—(default: 30) the number of seconds to wait before starting another checkpoint after a checkpoint completes; and (optional) 'job-checkpoint-frequency-seconds'—(default: 60) the interval in seconds by which checkpoints should occur. The command returns a 200 (OK) status instead of a 202 (Accepted) because Flink's API returns a 200 when submitting a job. An example response (200 OK):

```
{
    "pipelineId":"038bf27f-52f0-40cf-95db-b70b83ade772",
    "data":null,
    "statusCode":200
}
```

The GET/api/pipelines/{uuid}/data/status 2081 returns the status of the data processing stages, by first determining if the pipeline exists in Flink 2082, following up with a check for the pipeline in the database if the pipeline does not exist in Flink 2083. If it does exist in the database, a "pipeline never started" status may be returned 2084, while if the pipeline does not exist in the database, a "404 pipeline not found" 2074 error may be returned. If, however, the pipeline does exist in Flink 2082, the Flink status of the pipeline is fetched 2085 and returned 2086. An example response (200 OK):

```
{
    "pipelineId":"038bf27f-52f0-40cf-95db-b70b83ade772",
    "data":"RUNNING",
    "statusCode":200
}
```

The POST/api/pipelines/{uuid}/data/stop command stops the data processing stages in a pipeline (i.e., calls Flink with a save point). Returns an error if the pipeline does not have data processing stages. The command uses request parameter 'graceful' (optional): indicates whether to stop the pipeline with a save point. Acceptable values: 'true', 'false' (defaults to 'true'). An example response (202 Accepted):

```
{
    "pipelineId":"038bf27f-52f0-40cf-95db-b70b83ade772",
    "data":null,
    "statusCode":202
}
```

The POST/api/pipelines/{uuid}/stop/all stops the data processing stages in a pipeline (i.e., calls Flink with a save point). Returns an error if the pipeline does not have data processing stages. The command uses request parameter 'graceful' (optional): indicates whether to stop the pipeline with a save point. Acceptable values: 'true', 'false' (defaults to 'true'). An example response (202 Accepted):

```
{
    "pipelineId":"038bf27f-52f0-40cf-95db-b70b83ade772",
    "data":null,
    "statusCode":202
}
```

In both of the above stop commands, command is received 2091 and a test 2092 determines if the pipeline exists in Flink. If is exists, a request to Flink 2095 is made and the Flink results are returned 2096; otherwise a reject Pipeline ID is not running is returned 2094.

FIG. 20D Illustrate the operation of Delete 2003 and Put commands. The DELETE/api/pipelines/{uuid} 2003 deletes the pipeline from the database. Does not stop the pipeline, so it's expected that the user calls 'GET . . . /stop' first. Calls to delete the pipeline while it is already active will be rejected. The command is received 2301 and data is retrieved from the data store 2302. Test 2303 determines if the pipeline exists in the database. If not a Reject 404 pipeline not found is returned; otherwise test 2305 determines if the pipeline is active in Flink. If not, a Reject 404 pipeline not found is also returned 2304; otherwise the pipeline is deserialized 2306 and a stop Env function is called 2307. Test 2308 determines whether the teardown was successful. If so, an update to the pipeline is made to indicate a new state 2309; otherwise remediation may be initiated 2310.

The PUT/api/pipelines command 2004 is a command having a content type: 'application/json.' This command updates the pipeline in the database, but does not start or stop the pipeline. A pipeline with no environmental stages and no data processing stages is considered invalid. The command uses payload fields: 'pipeline' (required): See ['POST/api/pipelines'](#post-apipipelines) uuid of pipeline to update must be in the payload. An Example response (200 OK):

```
{
    "pipelineId":"038bf27f-52f0-40cf-95db-b70b83ade772",
    "data":"Pipeline updated",
    "statusCode":200
}
```

The command is received 2401 and data is retrieved from the data store 2402. Test 2403 determines if the pipeline exists in the database. If not a Reject 404 pipeline not found is returned 2404; otherwise test 2405 determines if the ENV has not been started. If it has not been started, a Reject cannot update pipeline not active is returned 2408; otherwise the pipeline is inserted into the database 2406 and a success indication is returned 2407.

The skilled person will be aware of a range of possible modifications of the various embodiments described above. Accordingly, the present invention is defined by the claims and their equivalents.

What is claimed is:

1. A system for predictive analysis of very large data sets using a directed computational graph, comprising:
a processor, a memory, a non-volatile data storage, and a first plurality of programming instructions stored in the memory and operable on the processor of a computing device;
a pipeline construction module comprising a second plurality of programming instructions stored in the memory of the computing device, wherein the second plurality of programming instructions, when operating on the processor of the computing device, cause the computing device to:
present a graphical user interface to a user comprising modular building blocks, each comprising modular building blocks comprising either a declarative definition of an environmental orchestration stage of a streaming analytics workflow or a declarative definition of a data processing stage of a streaming analytics workflow; and
receive and store input from the user through the graphical user interface, the input comprising a directed computational graph representing a streaming analytics workflow constructed by the user using the modular building blocks wherein:
the directed computational graph comprises nodes representing workflow stages and edges representing message outputs between the workflow stages;
the directed computation graph comprises at least one cyclic workflow stage; and
the workflow stages further comprise:
one or more environmental orchestration stages, each configured to:
set up data processing stages and data paths during execution of the streaming analytics workflow according to the following algorithm:
receive a command to initiate a new pipeline;
check whether the new pipeline exists in a database stored on the non-volatile data storage device;
if the new pipeline exists in the database, reject initiation of the new pipeline;
otherwise, update the database with the new pipeline and create the new pipeline; and
teardown data processing stages during execution of the streaming analytics workflow according to the following algorithm:

receive a command to tear down an initiated pipeline;
check whether the initiated pipeline exists in the database stored on the non-volatile data storage device;
if the initiated pipeline exists in the database, deserialize the initiated pipeline and update the database to indicated that the initiated pipeline has been deserialized;
otherwise, return a rejection notification stating that the initiated pipeline cannot be found;
wherein the data processing stages each comprise one or more data source stages, one or more data sink stages, and a plurality of transformation stages;
a pipeline processing module comprising a third plurality of programming instructions stored in the memory of the computing device, wherein the third plurality of programming instructions, when operating on the processor of the computing device, cause the computing device to:
retrieve the stored directed computational graph;
receive a first data stream for analysis using the directed computational graph; and
process the first data stream through the streaming analytics workflow in accordance with directed computational graph; and
a production rule system comprising a fourth plurality of programming instructions stored in the memory of the computing device, wherein the fourth plurality of programming instructions, when operating on the processor of the computing device, cause the computing device to:
receive a text-based query from the user related to the streaming analytics workflow of the directed computational graph;
analyze the query to extract semantic data using a backend oracle configured for semantic analysis;
construct a rule to be applied to the streaming analytics workflow using the semantic data;
apply the rule to the streaming analytics workflow by modifying the directed computational graph in accordance with the rule.

2. The system of claim 1, wherein a workflow stage in the directed computational graph is constructed using a different workflow stage in the directed computational graph.

3. The system of claim 1, wherein the pipeline processing module is configured to employ exactly-once semantics, wherein a datapoint is the data stream impacts the construction of the directed computational graph the first time that it is received, and subsequent instances of an identical or semantically-similar datapoint in the data stream do not impact the construction of the directed computational graph.

4. The system of claim 1, wherein the streaming analytics workflow comprises analysis of the data stream in a sliding time window.

5. The system of claim 1, wherein the modular building blocks are domain-agnostic.

6. The system of claim 1, wherein the modular building blocks are domain-specific.

7. The system of claim 1, wherein the pipeline processing module receives a second data stream comprising a data context that is preserved from the first stream into a node of the directed computational graph, the data context shared at the node allowing the first data stream and the second data stream to share common meaning of data associated with the data context.

8. A method for predictive analysis of very large data sets using a directed computational graph, comprising the steps of:
presenting a graphical user interface to a user comprising modular building blocks, each comprising modular building blocks comprising either a declarative definition of an environmental orchestration stage of a streaming analytics workflow or a declarative definition of a data processing stage of a streaming analytics workflow; and
receiving and storing input from the user through the graphical user interface, the input comprising a directed computational graph representing a streaming analytics workflow constructed by the user using the modular building blocks wherein:
the directed computational graph comprises nodes representing workflow stages and edges representing message outputs between the workflow stages;
the directed computation graph comprises at least one cyclic workflow stage; and
the workflow stages further comprise:
one or more environmental orchestration stages, each configured to:
set up data processing stages and data paths during execution of the streaming analytics workflow according to the following algorithm:
receive a command to initiate a new pipeline;
check whether the new pipeline exists in a database stored on the non-volatile data storage device;
if the new pipeline exists in the database, reject initiation of the new pipeline;
otherwise, update the database with the new pipeline and create the new pipeline; and
teardown data processing stages during execution of the streaming analytics workflow according to the following algorithm:
receive a command to tear down an initiated pipeline;
check whether the initiated pipeline exists in the database stored on the non-volatile data storage device;
if the initiated pipeline exists in the database, deserialize the initiated pipeline and update the database to indicated that the initiated pipeline has been deserialized;
otherwise, return a rejection notification stating that the initiated pipeline cannot be found;
one or more data processing stages each comprising one or more data source stages, one or more data sink stages, and a plurality of transformation stages;
retrieving the stored directed computational graph;
receiving a first data stream for analysis using the directed computational graph;
processing the first data stream through the streaming analytics workflow in accordance with directed computational graphs receiving a text-based query from the user related to the streaming analytics workflow of the directed computational graph;
analyzing the query to extract semantic data using a backend oracle configured for semantic analysis;
constructing a rule to be applied to the streaming analytics workflow using the semantic data;
applying the rule to the streaming analytics workflow by modifying the directed computational graph in accordance with the rule.

9. The method of claim 8, wherein a workflow stage in the directed computational graph is constructed using a different workflow stage in the directed computational graph.

10. The method of claim 8, wherein the construction of the directed computational graph employs exactly-once semantics, wherein a datapoint is the data stream impacts the construction of the directed computational graph the first time that it is received, and subsequent instances of an identical or semantically-similar datapoint in the data stream do not impact the construction of the directed computational graph.

11. The method of claim 8, wherein the streaming analytics workflow comprises analysis of the data stream in a sliding time window.

12. The method of claim 8, wherein the modular building blocks are domain-agnostic.

13. The method of claim 8, wherein the modular building blocks are domain-specific.

14. The method of claim 8, further comprising the step of receiving a second data stream comprising a data context that is preserved from the first stream into a node of the directed computational graph, the data context shared at the node allowing the first data stream and the second data stream to share common meaning of data associated with the data context.

\* \* \* \* \*